(12) United States Patent
Zhang

(10) Patent No.: US 12,553,912 B2
(45) Date of Patent: Feb. 17, 2026

(54) LIQUID DISTRIBUTION METHOD AND IMMUNOASSAY METHOD

(71) Applicant: SHENZHEN INCRECARE BIOTECH CO. LTD, Shenzhen (CN)

(72) Inventor: Zhen Zhang, Shenzhen (CN)

(73) Assignee: SHENZHEN INCRECARE BIOTECH CO. LTD, Shenzhen (CN)

( * ) Notice: Subject to any disclaimer, the term of this patent is extended or adjusted under 35 U.S.C. 154(b) by 942 days.

(21) Appl. No.: 17/427,859

(22) PCT Filed: Apr. 11, 2019

(86) PCT No.: PCT/CN2019/082169
§ 371 (c)(1),
(2) Date: Aug. 2, 2021

(87) PCT Pub. No.: WO2020/155386
PCT Pub. Date: Aug. 6, 2020

(65) Prior Publication Data
US 2022/0113325 A1    Apr. 14, 2022

(30) Foreign Application Priority Data
Feb. 2, 2019  (CN) .......... 201910107872.0

(51) Int. Cl.
*G01N 35/10*    (2006.01)
*G01N 33/53*    (2006.01)
(Continued)

(52) U.S. Cl.
CPC ......... *G01N 35/04* (2013.01); *G01N 33/5302* (2013.01); *G01N 35/1002* (2013.01);
(Continued)

(58) Field of Classification Search
CPC ............... G01N 35/04; G01N 33/5302; G01N 35/1002; G01N 2035/00465;
(Continued)

(56) References Cited

U.S. PATENT DOCUMENTS 5,587,129 A    12/1996    Kurosaki et al.
9,279,760 B2 *  3/2016   Imazu ............... G01N 21/01
(Continued)

FOREIGN PATENT DOCUMENTS

CN    1963527 A    5/2007
CN    101419240 A    4/2009
(Continued)

OTHER PUBLICATIONS

International Search Report for PCT/CN2019/082169 with English Translation mailed Oct. 30, 2019, 7 pages.
(Continued)

*Primary Examiner* — Rebecca M Fritchman
(74) *Attorney, Agent, or Firm* — Dickinson Wright PLLC

(57) ABSTRACT

A liquid distribution method comprises: providing at least two ferrying units, each ferrying unit made to reciprocate between an initial workstation and a first workstation; transferring from the initial workstation onto each ferry unit a reactor containing a sample; at the first workstation, adding a reagent into the reactor; recording, as a first cycle, a shortest time window during which a sequence of actions performed by each ferry unit can be cyclically reproduced, and recording, as a second cycle, a quotient obtained by dividing the first cycle by the number of ferry unit, and successively transferring the reactors to other ferry units staggeredly at intervals of the second cycle; and sequentially removing from the ferry units the reactors for which the mixing has been completed, staggeredly at intervals of the second cycle, and placing another reactor containing the
(Continued)

sample onto the ferry unit from which the reactor was removed.

20 Claims, 11 Drawing Sheets

(51) Int. Cl.
  *G01N 35/04* (2006.01)
  *G01N 33/531* (2006.01)
  *G01N 35/00* (2006.01)
(52) U.S. Cl.
  CPC .............. *G01N 2035/00465* (2013.01); *G01N 2035/0401* (2013.01)
(58) Field of Classification Search
  CPC .. G01N 2035/0401; G01N 1/38; G01N 35/10; G01N 35/0092; G01N 33/531; G01N 33/54326; G01N 35/00584
  See application file for complete search history.

(56) References Cited

U.S. PATENT DOCUMENTS

| | | |
|---|---|---|
| 2009/0071269 A1 | 3/2009 | Sento et al. |
| 2014/0241946 A1 | 8/2014 | Self et al. |
| 2015/0226761 A1 | 8/2015 | Mizutani et al. |
| 2015/0276775 A1* | 10/2015 | Mellars .............. G01N 35/0092 422/65 |
| 2016/0054343 A1* | 2/2016 | Holmes ................ G01N 35/026 422/65 |
| 2021/0041472 A1* | 2/2021 | Limbach ................. B01L 3/021 |

FOREIGN PATENT DOCUMENTS

| | | |
|---|---|---|
| CN | 104111341 A | 10/2014 |
| CN | 106645765 A | 5/2017 |
| CN | 107656085 A | 2/2018 |
| CN | 107942085 A | 4/2018 |
| CN | 108061810 A | 5/2018 |
| CN | 108226549 A | 6/2018 |
| CN | 207866714 U | 9/2018 |
| CN | 207866715 U | 9/2018 |
| CN | 207866716 U | 9/2018 |
| CN | 109142768 A | 1/2019 |
| CN | 208420505 U | 1/2019 |

OTHER PUBLICATIONS

EP Search Report for EP Application No. 19912566.7, dated Mar. 16, 2022, 6 pages.
First Office Action with English Translation for Chinese Application No. 201910107872.0, dated Apr. 6, 2021, 20 pages.
Notice of Grant with English Translation for Chinese Application No. 201910107872.0, dated Jul. 13, 2021, 3 pages.

* cited by examiner

LIQUID DISTRIBUTION METHOD AND IMMUNOASSAY METHOD

CROSS-REFERENCE TO RELATED APPLICATIONS

The present application is a national phase application of International Application No. PCT/CN2019/082169, filed on Apr. 11, 2019, which claims the priority of the Chinese patent application filed with Chinese Patent Office on Feb. 2, 2019, with the filing number of 201910107872.0, and the title of "Liquid Distribution Method and Immunoassay Method," the entire contents thereof being incorporated herein by reference.

TECHNICAL FIELD

The present application relates to the field of in vitro diagnosis (IVD) technology, in particular, to a liquid distribution method and an immunoassay method including the steps of the liquid distribution method.

BACKGROUND ART

A full-automatic immune analyzer can quantitatively or qualitatively detect target analytes, such as antibodies and antigens, contained in samples to be tested, e.g. blood, etc. Usually, the sample to be tested and reagents (also called as reactants) are added to an empty reactor, and subjected to the steps of mixing, incubating, and washing separation (Bound-free, i.e., BF separation, also called as cleaning herein), and then the signal reagent is added into the reactor, to measure optical or electrical signals, so as to realize the measurement and analysis of the target analytes contained in the sample to be tested.

An important parameter for measuring the working efficiency of the immune analyzer is the test throughput. The test throughput can be understood as the number of test results that can be reported by the immune analyzer per unit time, that is, the number of measured reactors containing the target analytes. The greater the total number of reactors measured per unit time is, the higher the test throughput of the immune analyzer is. Because the reaction modes and test processes of the analysis items are usually different, the test throughput of the immune analyzer is not constant. The maximum test throughput is usually used as a measure standard of the test speed of the immune analyzer. For convenient description of the present application, unless otherwise specified, the test throughput refers specifically to the maximum test throughput of the analyzer. The processing which the immune analyzer performs on the reactors is regarded as an assembly line. If in unit time, N reactors containing the target analytes complete the measurement and leave the assembly line, there must be N empty reactors entering the assembly line at the same time, in order to ensure that the test process is carried out continuously and reliably according to the maximum throughput. That is, the flow rate of the reactors at the inlet (inlet flow rate) of the assembly line is equal to the flow rate at the outlet (outlet flow rate). In the same way, in order to ensure that the entire assembly line is seamless and continuous, the flow rate of the reactors at each process in the assembly line should be equal to the inlet flow and the outlet flow, that is, the flow rate of all processes of the assembly line are equal.

Generally, due to the relatively long time occupied by sample distribution and reagent distribution as well as the mixing process of samples and reagents, the flow rates of the reactor in the processes of sample distribution and reagent distribution and in the mixing process are relatively low, which therefore becomes the bottleneck and shortcomings affecting work efficiency, making it difficult for the immune analyzer to meet the requirements of higher test throughput.

SUMMARY

A technical problem solved by the present application is how to improve the working efficiency of liquid distribution.

A liquid distribution method comprises the following steps:
providing at least two ferry units, so that each ferry unit is made to reciprocate between an initial workstation and a first workstation;
transferring onto each of the ferry units a reactor containing a sample from the initial workstation;
adding a reagent into the reactors at the first workstation;
recording, as a first cycle, a shortest time window during which a sequence of actions performed by each of the ferry units can be cyclically reproduced and recording, as a second cycle, a quotient obtained by dividing the first cycle by the number of ferry units, wherein starting from transferring the reactor to one ferry unit for the first time, the reactors are successively transferred to other ferry unit staggeredly at intervals of the second cycle; and
sequentially removing from the ferry units the reactors for which the mixing processing has been completed, staggeredly at intervals of the second cycle, and placing another reactor containing the sample onto the ferry unit from which the reactor was removed.

An immunoassay method comprises the steps in the liquid distribution method described above.

BRIEF DESCRIPTION OF DRAWINGS

In order to more clearly illustrate the technical solutions in the embodiments of the present application or the prior art, the drawings needed to be used in the description of the embodiments or the prior art are briefly introduced as follows. Obviously, the drawings in the following description are only some embodiments of the present application. For those skilled in the art, other drawings can be obtained based on these drawings without paying creative work.

DETAILED DESCRIPTION OF EMBODIMENTS

Figure 1:
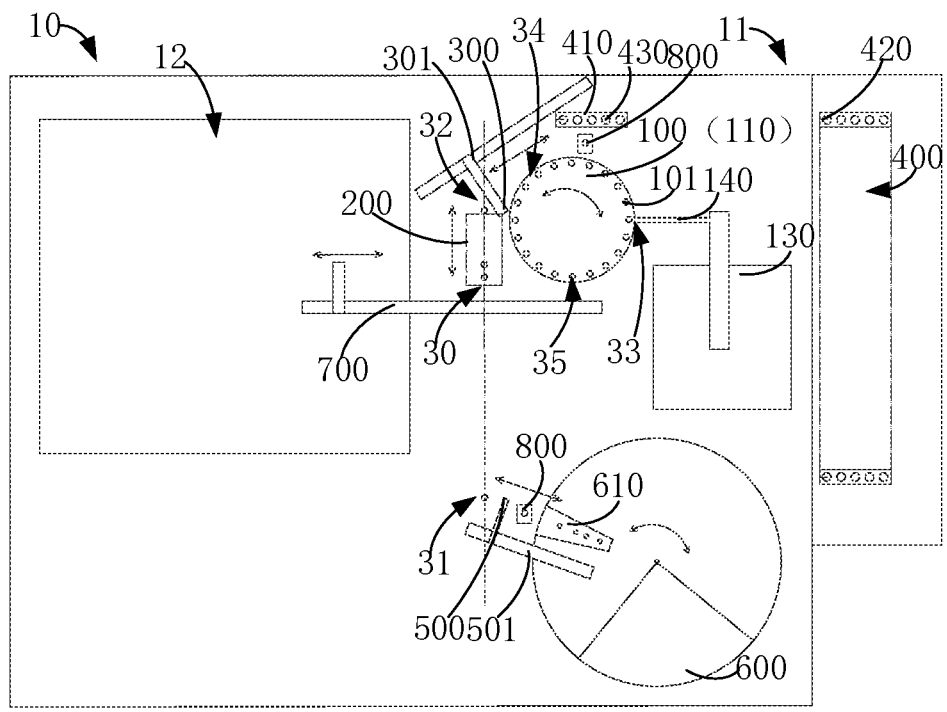
FIG. 1 is a planar schematic diagram of a structure of a first example of the immune analyzer provided by the first embodiment.

In order to facilitate the understanding of the present application, a more comprehensive description on the present application with reference to the drawings will be made as follows. The preferable embodiments of the application are shown in the accompanying drawings. However, the present application can be implemented in many different ways and is not limited to the embodiments described herein. On the contrary, the purpose of providing these embodiments is to more thoroughly and comprehensively understand the disclosure of the present application.

It should be noted that when an element is referred to as being "fixed to" another element, it can be directly located on said another element, or an intermediate element may also be present. When an element is considered as being "connected" to another element, it can be directly connected to said another element or an intermediate element may be present at the same time. The terms, "inner", "outer", "left", "right" and similar expressions used herein are used for illustrative purposes only, which do not indicate that they are exclusive.

Referring to FIGS. 1 to 8 at the same time, the incubation of samples and reagents (also called as reactants) refers to the process of an antigen-antibody binding reaction or a biotin-avidin binding reaction of reactants in the reactor in a constant temperature environment before washing separation starts in the reactor 20. The reagents and analysis items described here have a "one-to-one correspondence" relationship therebetween, that is, the specific reagents corresponding to different analysis items are generally different in terms of formula, reagent quantity, component quantity, and etc. Depending on the specific analysis items, reagents usually comprise multiple components, such as, commonly including 2-5 components, comprising magnetic particles, markers, diluents, dissociating agents and other reagent components (corresponding reagent components can be respectively represented by R1, R2, R3, R4). For example, T4 reagent (thyroxine) contains three components: magnetic particles (R1), markers (R2), and dissociating agent (R4). Depending on the different reaction modes, multiple reagent components of one analysis item can be distributed at one time, or distributed in multiple steps. When they are distributed in steps, they are defined as the first reagent, the second reagent, the third reagent, and etc. according to the order of the distribution. After the incubation is completed, they are subject to the washing separation. The washing separation refers to a process of using a magnetic field to capture the bound magnetic particles and/or marked compounds, and simultaneously removing free markers and other unreacted or un-bound components (referred to as the unbound ingredients herein for convenient description). After the washing separation, the signal reagent is distributed, and the signal incubation is carried out (typically, for 1-6 minutes). Finally, the amount of luminescence (called as the reactant signal herein for convenient description) produced by the reaction between the marker reagent and the signal reagent is measured. The signal reagent is used to measure generation of the signal (usually the amount of luminescence). It is usually a kind of general reagent and has a "one-to-many" correspondence with the analysis item. That is, different analysis items share the signal reagent. The signal incubation refers to a process in which after the signal reagent is distributed to the reactor 20 after the washing separation, reaction is performed for a period of time in a constant temperature environment so that the signal is enhanced. It should be pointed out that due to the specific components of the signal reagents being different, some luminescence systems do not need the signal incubation, but can be measured directly during the distribution of the signal reagent or after the distribution of the signal reagent. One or more kinds of the signal reagent are possible. For example, some signal reagents comprise a first signal reagent, a second signal reagent, and so on. In an immunoassay device, after the above processes, the antigen or antibody contained in the sample bound to the marker reagent is quantitatively or qualitatively determined. In addition, the immune analyzer 10 can perform, on the sample, the analysis corresponding to several different analysis items.

The duty period or cycle, referred to as the cycle, is a shortest time window that can be reproduced cyclically during the test process. It usually has a fixed length of time. In the cycle time, a certain number of process operations, tasks or work packages, such as liquid extraction, mixing, incubation, washing separation, measurement and other operations and tasks, are executed serially or in parallel according to a controllable order. The tasks of the same part during one cycle are usually executed serially. Tasks of different parts during a same cycle can be executed serially or in parallel, which is depending on whether there is a dependency relationship between the actions of related parts. All process operations performed in one cycle are performed only when needed, and may not necessarily be repeated in another cycle. In particular, certain process operations may be repeated in every cycle, while others may occur every two or more cycles. When multiple tests are performed continuously, since each test is usually at a different stage of the test process, among all the process operations that occur in a single cycle, only certain process operations are dedicated to execute one test, while other process operations are used to perform other tests. As for parts with speed bottlenecks, the improvement of the test efficiency and throughput can be achieved by increasing the number of parts and extending the cycle of parts. Therefore, the working periods of different parts are not necessarily the same. That is, there may be multiple parallel cycles in a same system. Generally, there is a multiple relationship between the time lengths of multiple parallel cycles, wherein the multiple is usually equal to the number of the same parts. When there are two working periods, they are called as the first cycle and the second cycle respectively. For example, when the number of the ferry units 200 is N (N≥2, which is a natural number), each ferry unit 200 works in the first cycle, the length of the first cycle is N times that of the second cycle, and the N ferry units 200 run in a sequence of actions, which are continuously "staggered in parallel" for the second cycle.

It should be pointed out that not all parts or operations work according to the working period, and the working process of some parts or operations has no influence on the test performance or test results. It is possible that they do not work according to a fixed cycle, for example, the supply of the reactors 20 may not have a fixed working period.

Referring to FIGS. 1 to 5, the immune analyzer 10 provided by an embodiment of the present application comprises a liquid distribution device 11 and a reaction device 12. The liquid distribution device 11 is located beside the reaction device 12. The liquid distribution device 11 is used to perform the distribution of the sample and the reagent and the mixing of the sample and the reagent in the reactor 20. The reaction device 12 is used to perform incubation, washing separation, and measurement on the sample and reagent (reactant) after being mixed in the reactor 20.

The liquid distribution device 11 comprises a buffer unit 100, a supply silo 130, a supply slide channel 140, a ferry unit 200, a sample addition member 300, a sample conveying unit 400, a reagent distribution member 500, a storage unit 600, a transferring unit 700, a cleaning tank 800 and a sorting mechanism. Of course, the liquid distribution device 11 may also comprise a sample addition drive unit 301, a reagent drive unit 501, and a sample addition power unit and a reagent distribution power unit. The sample addition member 300 is installed on the sample addition drive unit 301. The sample addition drive unit 301 is used to drive the sample addition member 300 to move, so that the sample addition member 300 sucks or discharges the sample under the action of the sample addition power unit. The reagent distribution member 500 is installed on the reagent drive unit 501, and the reagent drive unit 501 is used to drive the reagent distribution member 500 to move, so that the reagent distribution member 500 sucks or discharges the reagent by means of the reagent distribution power unit. The sample addition power unit and the reagent distribution power unit can use general fluid metering devices, such as syringes, plunger pumps, quantitative pumps, and so on.

The sample conveying unit 400 may comprise a sample rack 410, sample tubes 430, and conveying rails 420. The sample rack 410 can cooperate with the conveying rails 420, and the sample tubes 430 are placed on the sample rack 410. The sample tubes 430 are used to accommodate samples. For example, about five to ten sample tubes 430 can be placed on each sample rack 410. When the sample rack 410 drives the sample tubes 430 to move to designated positions along the respective conveying rails 420, the sample addition member 300 sucks samples in the sample tubes 430 and distributes the samples to the empty reactors 20.

The supply silo 130 is used to store the clean and empty reactors 20. The sorting mechanism can be used to sort the randomly placed reactors 20 coming from the supply silo 130, so as to arrange them in a certain order. The supply slide 140 guides the sorted reactors 20 into the buffer unit 100 one by one. The buffer unit 100 is used for buffering (temporarily storing) the reactors 20 transported from the supply slide channel 140.

Referring to FIG. 1, in some embodiments, the entire liquid distribution device 11 has receiving workstations 33, sample addition workstations 34 and removing workstations 35. The buffer unit 100 comprises a turntable 110. The turntable 110 can rotate around its own central axis. A plurality of buffer portions 101 are provided on the turntable 110. The buffer portions 101 are used to carry the reactors 20, and the buffer portions 101 each can be an accommodating hole. Of course, the accommodating hole can also be replaced by a solid structure, such as a support bracket, as long as the reactors 20 can be placed on the turntable 110. The buffer portions 101 are distributed at intervals along the circumference of the turntable 110. When the turntable 110 rotates, the buffer portions 101 can be driven to move between the receiving workstations 33, the sample addition workstations 34, and the removing workstations 35, so that the reactors 20 on the turntable 110 move between the receiving workstations 33, the sample addition workstations 34 and the removing workstations 35. Obviously, the turntable 110 drives the reactors 20 to make circular movement between the receiving workstations 33, the sample addition workstations 34, and the removing workstations 35.

Specifically, the reactor 20 from the supply slide channel 140 will enter the buffer portions 101 on the turntable 110 through the receiving workstation 33. When the turntable 110 drives the empty reactor 20 to move to the sample addition workstation 34, the sample addition member 300 can suck a sample from the sample tube 430 to distribute it into the reactor 20. After the turntable 110 drives the reactor 20 containing the sample to continue moving to the removing workstation 35, the transferring unit 700 separates the reactor 20 containing the sample from the turntable 110 at the removing workstation 35 and transfers it to the ferry unit 200.

The buffer portions 101 are arranged at intervals along the circumference of the turntable 110. The buffer units 100 may only be arranged to form a buffer circle, and the buffer circle is arranged close to the edge of the turntable 110. Of course, the buffer portions 101 can also be arranged to form multiple buffer circles, and the multiple buffer circles are arranged concentrically around the center axis of the turntable 110.

Figure 3:
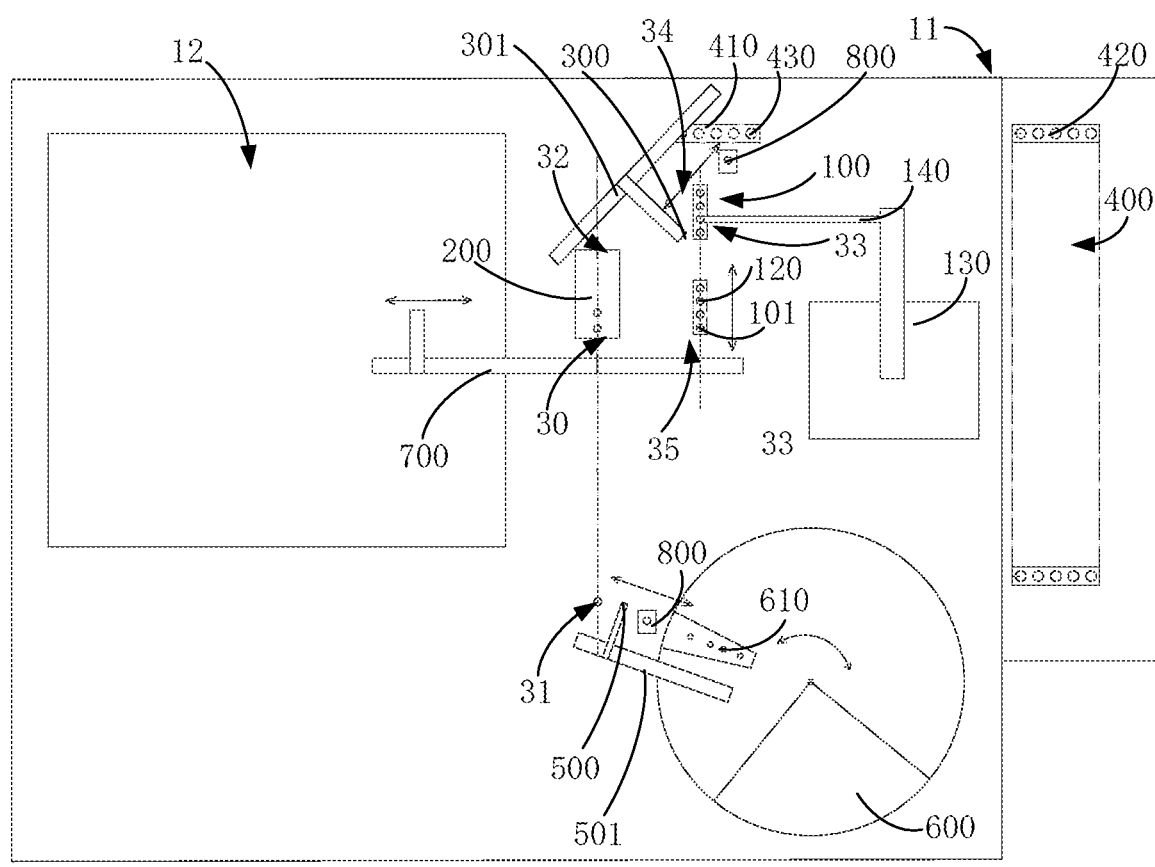
FIG. 3 is a planar schematic diagram of a structure of a second example of the immune analyzer provided by the first embodiment.

Referring to FIG. 3, in some embodiments, the buffer unit 100 comprises a slider 120. The slider 120 is also provided with buffer portions 101 for accommodating the reactors 20. The buffer portions 101 on the slider 120 may also be accommodating holes, and the buffer portions 101 may be distributed on the slider 120 at intervals along a straight line to form a row only. Of course, the buffer portions 101 may be distributed on the slider 120 at intervals along straight lines to form multiple rows. At this time, the multiple rows of buffer portions 101 are disposed and arranged on the slider 120 in a form of matrix. The slider 120 moves linearly between the receiving workstations 33, the sample addition workstations 34 and the removing workstations 35, thereby driving the buffer portions 101 (corresponding to the reactors 20) thereon to move between the receiving workstations 33, the sample addition workstations 34 and the removing workstations 35. Similarly, referring to the above-mentioned working mode of the turntable 110, the reactor 20 enters the slider 120 at the receiving workstation 33. The sample addition member 300 distributes the sample to the reactor 20 located at the sample addition member workstation 34. The transferring unit 700 separates the reactor 20 containing the sample from the slider 120 at the removing workstation 35 and transfers it to the ferry unit 200. In this embodiment, the slider 120 and the buffering portions 101 thereon perform linear reciprocating movement between the receiving workstations 33, the sample addition workstations 34, and the removing workstations 35, to complete the receiving of the reactors 20, the sample distribution, and the removal of the reactors 20 containing the samples. The volume of the slider 120 itself can be designed as being smaller, and at the same time, the area covered by the linear movement track of the slider 120 is smaller, which is beneficial to the optimized space layout of the supply silo 130, the supply slide channel 140, the sample conveying unit 400, the sample addition member 300, the transferring unit 700, and etc., making the liquid distribution device 11 more compact and lower in cost.

Figure 4:
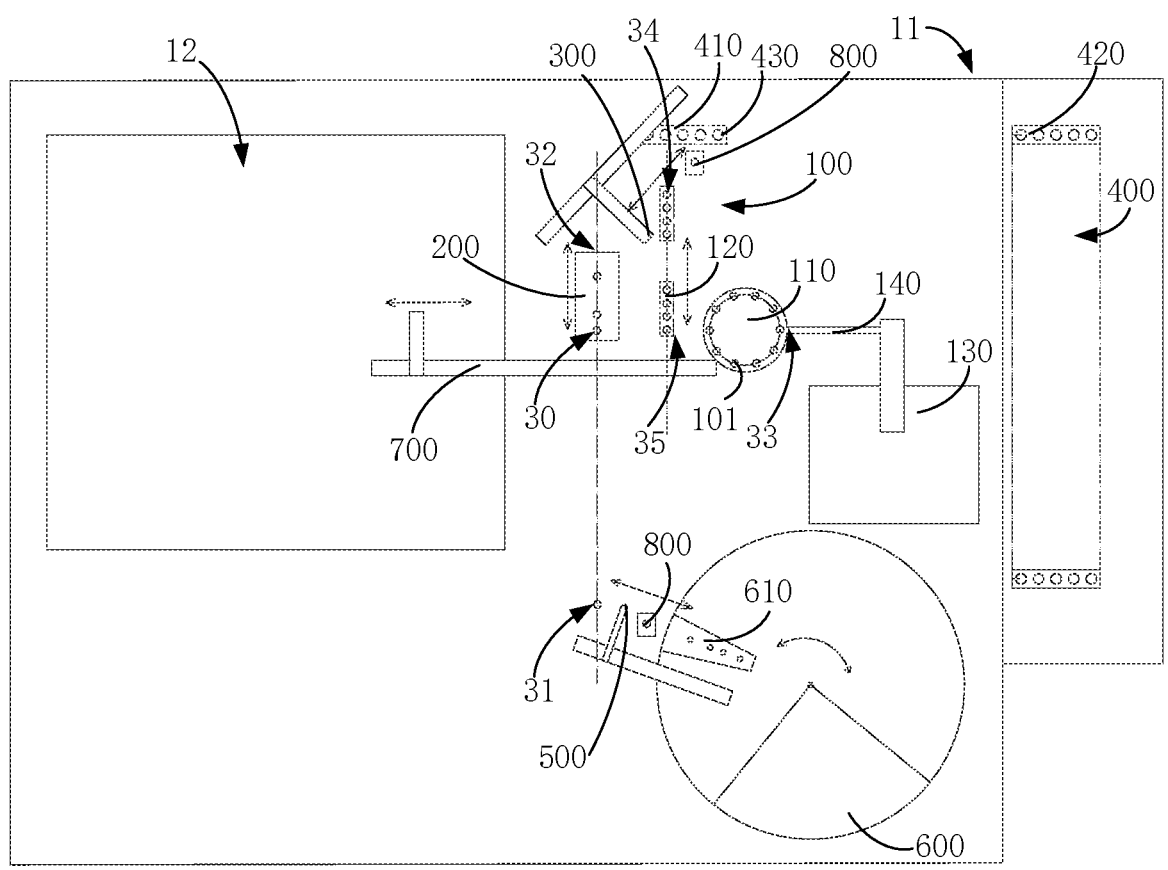
FIG. 4 is a planar schematic diagram of a structure of a third example of the immune analyzer provided by the first embodiment.

Referring to FIG. 4, in some embodiments, the buffer unit 100 comprises a turntable 110 and a slider 120, both of which are provided with buffer portions 101. The turntable 110 rotates around its central axis. The turntable 110 can drive the buffer portions 101 thereon to pass by the receiving workstations 33. The reactors 20 on the supply slide channel 140 will enter the buffer portions 101 on the turntable 110 at the receiving workstations 33. The slider 120 moves linearly between the sample addition workstations 34 and the removing workstations 35. After the turntable 110 drives the empty reactor 20 to rotate by a set angle from the receiving workstation 33, the transferring unit 700 can make the empty reactor 20 separated from the turntable 110 and transfer it to the slider 120 at the removing workstation 35. After the slider 120 drives the reactor 20 to move to the sample addition workstation 34, the sample addition member 300 distributes the sample to the empty reactor 20. Subsequently, the slider 120 drives the reactor 20 containing the sample to move to the removing workstation 35, and the transferring unit 700 separates the reactor 20 containing the sample from the slider 120 at the removing workstation 35 and transfers it to the ferry unit 200.

Figure 2:
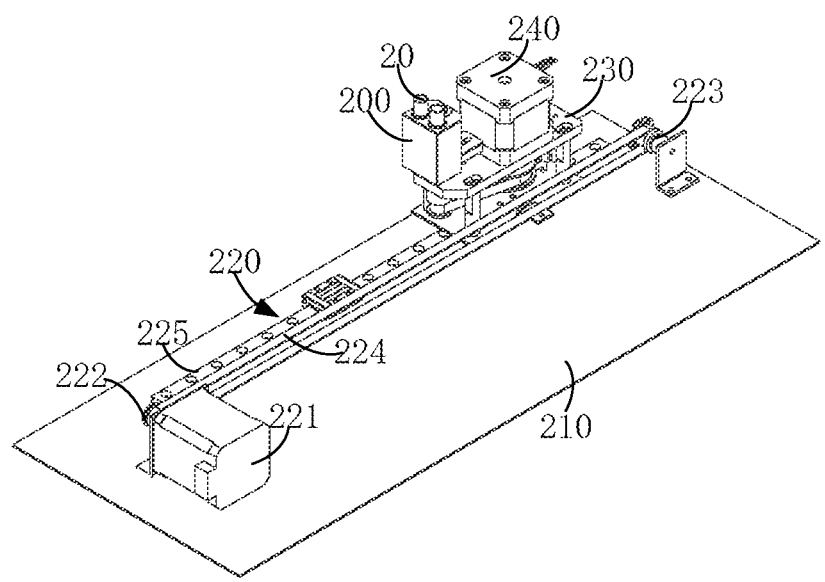
FIG. 2 is a partial schematic three-dimensional structural diagram of FIG. 1 comprising a ferry unit.

Referring to FIG. 2, in some embodiments, the liquid distribution device 11 further comprises a frame 210, a conveyor 220, a support base 230 and a driver 240. The conveyor 220 is provided on the frame 210, and the conveyor 220 is used to drive the support base 230 to slide relative to the frame 210. The conveyor 220 comprises a motor 221, a driving wheel 222, a driven wheel 223, and a timing belt 224. The motor 221 is used to drive the driving wheel 222 to rotate. The timing belt 224 is wound around the driving wheel 222 and the driven wheel 223. When the motor 221 rotates, the driving wheel 222 and the driven wheel 223 drive the timing belt 224 to move. Of course, in other embodiments, the conveyor 220 can also be replaced by one or more of transmission mechanisms, such as a screw mechanism and a rack and pinion, etc.

Specifically, a sliding rail 225 may be provided on the frame 210. The support base 230 cooperates with the slide rail 225. The timing belt 224 is connected to the support base 230 and drives the support base 230 to slide along the direction in which the slide rail 225 extends. Both the driver 240 and the ferry unit 200 are arranged on the support base 230. The ferry unit 200 is used to allow the reactor 20 to be placed. The driver 240 can drive the ferry unit 200 to produce eccentric oscillations, so that the sample and reagent (reactant) in the reactor 20 are mixed due to non-contact eccentric oscillations.

The ferry unit 200 may be provided with a plurality of accommodating holes. The reactor 20 is inserted into the accommodating hole, so as to realize that the ferry unit 200 carries the reactor 20. Of course, the accommodating hole can also be replaced by a solid structure, such as a bracket, as long as the reactor 20 can be placed on the ferry unit 200.

In some embodiments, the entire liquid distribution device 11 also has an initial workstation 30 and a first workstation 31. When the motor 221 is in operation, the ferry unit 200 can be made to perform a reciprocating linear movement between the initial workstation 30 and the first workstation 31. When the ferry unit 200 is located at the initial workstation 30, the transferring unit 700 can transfer the reactor 20 containing the sample, from the buffer unit 100 to the ferry unit 200 at the initial workstation 30. Then, the ferry unit 200 drives the reactor 20 containing the sample to move to the first workstation 31. The reagent distribution member 500 will suck a reagent from the storage unit 600 used for storing reagents, and distribute the reagent to the reactor 20 located at the first workstation 31. Then, during the linear movement of the ferry unit 200, the driver 240 can drive the ferry unit 200 to eccentrically oscillate, thereby mixing the sample and reagent in the reactor 20, so that the mixing of the reactants and the movement of the ferry unit 200 can be performed at the same time. That is, the ferry unit 200 can simultaneously mix the reactants in the reactor 20 during its movement, which improves the mixing efficiency and mixing effect, thereby increasing the test throughput of the whole machine. Of course, during the static processes before and after the movement of the ferry unit 200, the driver 240 can also drive the ferry unit 200 to eccentrically oscillate, so as to mix the sample and reagent in the reactor 20 uniformly. The ferry unit 200 returns, to the initial workstation 30, the reactor 20 into which the reagent has being distributed. The transferring unit 700 can make the reactor 20, in which the reactants have been mixed, separated from the ferry unit 200 at the initial workstation 30, and transfer it to the reaction device 12 so that the reactor 20 can perform incubation, the washing separation and the measurement processing on the reaction device 12.

It can be seen that the driver 240 directly produces the eccentric oscillation on the ferry unit 200, so that the reactants in the reactor 200 on the ferry unit 200 can be mixed uniformly, without an additional independent mixing device. The linear movement or static status of the ferry unit 200 does not limit the mixing of the reactants in the reactor 200, which solves the problems that the mixing devices are complicated, the mixing efficiency is low, and the mixing effects is poor in the prior art. In addition, the ferry unit 200 makes a linear movement between the sample addition unit 300, the transferring unit 700, and the reagent distribution member 500. On the one hand, the difficulty for controlling the linear movement is reduced, which makes the movement of the ferry unit 200 more precise and efficient, which prevents the ferry unit 200 from deviating from the designated parking position, and ensures that the ferry unit 200 can accurately and timely stop at the initial workstation 30 or the first workstation 31. It is ensured that the reactor 20 containing the sample can be smoothly transferred to the ferry unit 200 from the initial workstation 30, and it can also be ensured that the reagent distribution member 500 can reliably add the reagent to the reactor 20 at the first workstation 31, and on the other hand, it makes the reactor 20 containing the sample carried on the buffer unit 100 and wait for being transferred to the ferry unit 200 to be added with the reagent and mixed therewith. There is no need to transfer all the reactors 20 containing the samples to the ferry unit 200, so that the carrying space of the buffer unit 100 is fully utilized, so that the number of reactors 20 carried by the ferry unit 200 at the same time is reduced, ensuring that the volume of the ferry unit 200 is designed as being smaller and the structure is more compact. At the same time, the area covered by the linear movement track of the ferry unit 200 is smaller, which solves the problem that the sample addition member 300, the transferring unit 700, and the reagent distribution member 500 in the prior art must be limited as being arranged along a large-radius rotation disc or a rotary disc. It optimizes the spatial layout between parts or units and controlling process, and can more efficiently connect and coordinate the logical actions between the sample addition member 300, the transferring unit 700, and the reagent distribution member 500, which not only makes the immune analyzer more compact, but also improves overall work efficiency.

By using the reactor 20 on the buffer unit 100 for distributing the sample, the reactor 20, into which the sample has been distributed, is transferred to the ferry unit 200 to distribute the reagent which are then mixed, so that the distribution of the samples and the distribution of the reagent are achieved on independent different units respectively, and the mixing is directly realized on the ferry unit, which solves the problem that the distribution of samples and the distribution of reagents in the prior art limit each other, and the problem that the reactants are mixed separately at a specific workstation, therefore improving efficiency of distributing and mixing the liquid.

In some embodiments, the storage unit 600 is a rotatable circular disk. The storage unit 600 is arranged close to the first workstation 31, and a plurality of storage parts 610 are arranged on the storage unit 600. The storage part 610 is used to accommodate and store the reagent container. The reagent is contained in the reagent container. The reagent distribution member 500 is used for sucking the reagent components in the reagent container on the storage part 610 and distributing the reagent components to the reactor 20 at the first workstation 31. The number of storage parts 610 can be set as needed. In consideration of usage requirements, cost and layout, the number of storage parts 610 on each storage unit 600 is preferably 15-50. For example, the number of storage units 610 on each storage unit 600 is 25, so that two storage units 600 can store totally 50 reagent containers online at the same time. Each storage unit 600 stores all the reagent components required by the corresponding analysis item. For example, in an analysis item, a total of three reagent components of magnetic particles, marker and dissociation agent must be distributed to the reactor 20, and then the three components of magnetic particles, marker and dissociation agent are stored on the same storage unit 600. When a certain analysis item needs to load multiple reagent containers to expand the machine test volume of the item, the multiple reagent containers can be stored on each storage unit 600 in any suitable combination. For example, when there are two storage units 600 and three TSH (thyroid stimulating hormone) reagent containers, each containing 100 tests, are needed to be loaded, all three TSH reagent containers can be loaded on one same storage unit 600, or one TSH reagent container can be loaded on one storage unit 600 and the other two can be loaded on the other storage unit 600. When the storage unit 600 rotates intermittently, the storage part 610 can be driven to move to the designated suction workstation, so that the reagent distribution member 500 sucks the reagent on the storage part 610 at the suction workstation and distributes it into the reactor 20.

During the process of the storage part 610 rotating (revolution) following the storage unit 600, at least one cavity of the reagent container on the storage part 610 (such as, a magnetic particle cavity containing magnetic particle reagent component) auto-rotates around its own central axis, so that the magnetic particle reagent component present in the form of a solid suspension generates a vortex, preventing the solid substances (such as magnetic particles) therein from being precipitated. A scanner can also be provided on the storage unit 600, and the scanner can identify the barcode information of the reagent container on the storage part 610, so as to distinguish different reagents. A refrigerator may also be provided on the storage unit 600. The refrigerator can perform refrigeration processing on the reagents in the storage part 610, thereby realizing the online long-term storage of the reagents.

The transferring unit 700 is used to transfer the reactor 20 between the ferry unit 200, the buffer unit 100 and the reaction device 12. The transferring unit 700 can perform horizontal movement and vertical movement. Obviously, both the removing workstation 35 and the initial workstation 30 are on the movement track of the transferring unit 700.

Figure 9:
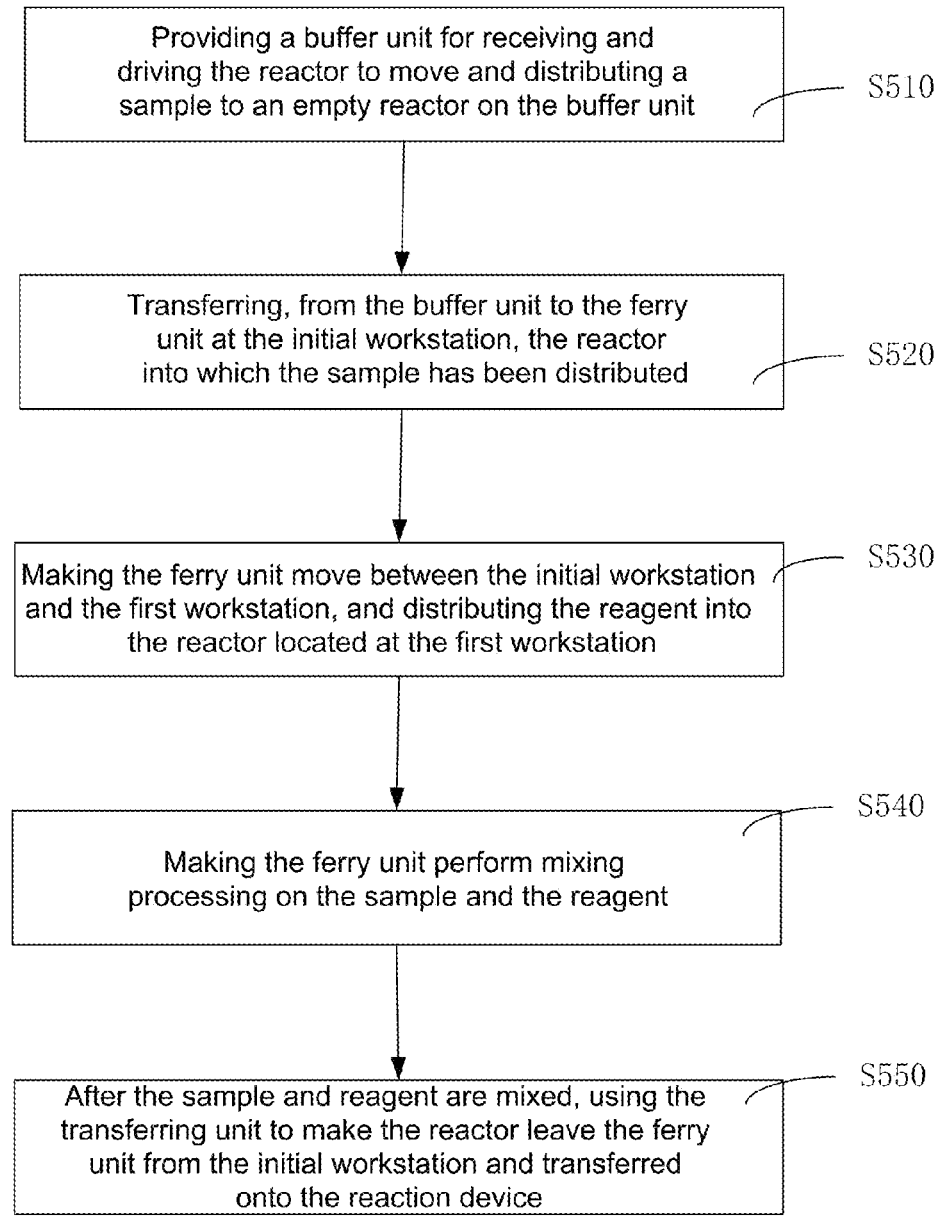
FIG. 9 is a flow chart of a first liquid distribution method.

When the liquid distribution device 11 is used to distribute the sample and the reagent into the reactor 20 and mix the sample and the reagent, the first liquid distribution method can be formed. The main feature of the first liquid distribution method is that the sample is distributed from the buffer unit 100 (not from the ferry unit 200) to the reactor 20. Referring to FIG. 9, the first liquid distribution method mainly comprises the following steps:

S510, providing a buffer unit 100 for receiving and driving the reactor 20 to move, and distributing a sample to an empty reactor 20 on the buffer unit 100;

S520: making the ferry unit 200 stop at the initial workstation 30, and transferring, from the buffer unit 100 to the ferry unit 200 at the initial workstation 30, the reactor 20 into which the sample has been distributed;

S530, making the ferry unit 200 move between the initial workstation 30 and the first workstation 31, and distributing the reagent into the reactor 20 located at the first workstation 31, wherein, of course, the ferry unit 200 can make a linear movement between the initial workstation 30 and the first workstation 31, wherein when the ferry unit 200 carrying the reactor 20 with the distributed sample is moving or being stationary, the sample can be distributed to an empty reactor 20 on the buffer unit 100 at the same time;

S540: making the ferry unit 200 perform mixing processing on the sample and the reagent after the reagent is distributed into the reactor 20, wherein the ferry unit 200 can mix the reactants in the reactor 20 in a non-contact eccentric oscillating manner, thereby eliminating the carryover in the reactants caused by other contact stirring, wherein in order to increase the test throughput, the ferry unit 200 can mix the sample and reagent in the reactor 20 during the movement from the first workstation 31 to the initial workstation 30; and S550, making the ferry unit 200 stop at the initial workstation 30, and after the sample and reagent are mixed, using the transferring unit 700 to make the reactor 20 leave the ferry unit 200 from the initial workstation 30 and transferred onto the reaction device 12.

In the first liquid distribution method, the shortest time window in which the sequence of actions in the above steps S520, S530, S540, and S550 executed by the ferry unit 200 can be reproduced is recorded as a working period T. The ferry unit 200 is made to receive, in one working period T, the reactor 20 into which the sample has been distributed at the initial workstation 30, linearly move to the first workstation 31 to allow the reactor 20 to receive distributed reagent, uniformly mix the reactants in the reactor 20, and linearly move to the initial workstation 30 to make the reactor 20 removed.

The time interval between the operations of continuously distributing the sample to at least two empty reactors 20 on the buffer unit 100 is recorded as a sample distributing interval t, where t=T, or there is at least one t, such that t<T. When t=T, the sample is distributed to the empty reactor 20 on the buffer unit 100 once within the interval of each working period T. In particular, when t<T, the sample is distributed to the empty reactors 20 on the buffer unit 100 for more than one time within the interval of the working period T. There is at least one t, so that when t<T, the time for distributing the sample to the empty reactors 20 on the buffer unit 100 is not fixed, which may not be limited by the working period T, but the sample distributing interval may be determined according to the needs of the test, which makes the test more flexible and efficient.

In the first liquid distribution method, the sample is only distributed from the buffer unit 100 to the reactor 20, and not from the ferry unit 200 to the reactor 20, so that the time for distributing the sample from the ferry unit 200 to the reactor 20 can be saved, which improves the working efficiency of the liquid distribution device. In some embodiments, when the buffer unit 100 only comprises the turntable 110 that performs the circular movement or only comprises the slider 120 that performs the linear movement, the step of distributing the sample to the buffer unit 100 comprises the following sub-steps:

inputting a reactor 20 from the receiving workstation 33 onto the buffer unit 100;

making the reactor 20 move, following the buffer unit 100, from the receiving workstation 33 to the sample addition workstation 34, and distributing the sample to the reactor 20 located at the sample addition workstation 34; and making the reactor 20 move, following the buffer unit 100, from the sample addition workstation 34 to the removing workstation 35, with the reactor 20 capable of being transferred from the removing workstation 35 to the ferry unit 200.

In some embodiments, when the buffer unit 100 comprises both the turntable 110 that performs circular movement and the slider 120 that performs the linearly movement, the step of distributing the sample to the buffer unit 100 comprises the following sub-steps:

inputting a reactor 20 from the receiving workstation 33 onto the turntable 110 of the buffer unit 100;

making the turntable 110 move around its own central axis, wherein the reactor 20 rotates following the turntable 110 by a set angle;

making the reactor 20 transferred from the turntable 110 onto the slider 120 of the buffer unit 100, making the reactor 20 follow the slider 120 to move linearly to the sample addition workstation 34, and distributing the sample to the reactor 20 located at the sample addition workstation 34; and making the reactor 20 follow the slider 120 to move linearly from the sample addition workstation 34 to the removing workstation 35, with the reactor 20 capable of being transferred from the removing workstation 35 to the ferry unit 200.

In order to ensure the maximum test throughput, one reactor 20 whose reactants have been mixed uniformly must be removed from the ferry unit 200 within a prescribed time. Therefore, when the duration that a single reactor 20 enters the ferry unit 200 until leaving the ferry unit 200 (that is, the total residence time that the single reactor 20 is on the ferry unit 200) is shorter, the test throughout is greater. For the traditional scheme of distributing both samples and reagents from the ferry unit 200 to the reactor 20, since it is always the ferry unit 200 to distribute the samples and reagents to the reactor 20 on the ferry unit, the residence time that the reactor 20 stays on the ferry unit 200 will comprise at least the sample distribution time, the reagent distribution time, the movement time of the ferry unit 200, and the mixing time of the reactants.

For the first liquid distribution method, the sample is only distributed from the buffer unit 100 to the reactor 20 (the sample is not distributed from the ferry unit 200 to the reactor 20), that is, the sample is only distributed to the reactor 20 of the buffer unit 100. After the reactor 20 containing the sample is transferred from the buffer unit 100 to the ferry unit 200, the reagent will be distributed to the reactor 20 containing the sample on the ferry unit 200. Therefore, compared with the traditional scheme, on the basis that the working efficiencies of the sample addition member 300 and the reagent distribution member 500 are the same and the operating speed of the ferry unit 200 is the same, the residence time that the reactor 20 stays on the ferry unit 200 only comprises the reagent distribution time, the movement time of the ferry unit 200 and the mixing time of the reactants, thereby saving the sample distribution time. The residence time that the reactor 20 stays on the ferry unit 200 is relatively shorter, so that the reactor 20 can mix the reactants uniformly during a relatively short time and leave the ferry unit 200, thereby increasing the test throughput of the entire immune analyzer 10.

In fact, as for the first liquid distribution method, the distribution of samples will not be restricted by the movement speed and location of the ferry unit 200. When the ferry unit 200 carrying the reactor 20 having the distributed sample is moving or being stationary, the sample addition member 300 can make full use of the idle waiting time, so that the sample is distributed from the buffer unit 100 to the reactor 20 in advance. The total residence time that a single reactor 20 is on the ferry unit 200 is shortened, and finally the goal of increasing the maximum test throughput is achieved. Therefore, while the reagent distribution member 500 distributes the reagent from the ferry unit 200 to the reactor 20 thereon, the sample addition member 300 can distribute the sample from the buffer unit 100 to the reactor 20 thereon, that is, the sample and reagent can be distributed synchronously, thereby eliminating the sample distribution time of the ferry unit 200. As for the traditional scheme, it is impossible that the sample distribution is not restricted by the movement speed and location of the ferry unit 200, and only when the ferry unit 200 arrives at the initial workstation 30, the sample addition member 300 can distribute the sample from the ferry unit to the reactor 20, thus it is impossible to distribute the sample and reagent to the reactor 20 at the same time.

Of course, on the basis of ensuring the same test throughput as the traditional scheme, in the first liquid distribution method c, the operating speeds (work efficiency or workload) of the ferry unit 200, the sample addition member 300, and the reagent distribution member 500 can be also appropriately reduce, which thus reduces the difficulty for controlling the movements of the ferry unit 200, the sample addition member 300 and the reagent distribution member 500, and also reduces the vibration, noise and failure of the parts in the liquid distribution device 11 due to high-speed operation, thus improving the entire stability and reliability of operation of the liquid distribution device 11.

Figure 10:
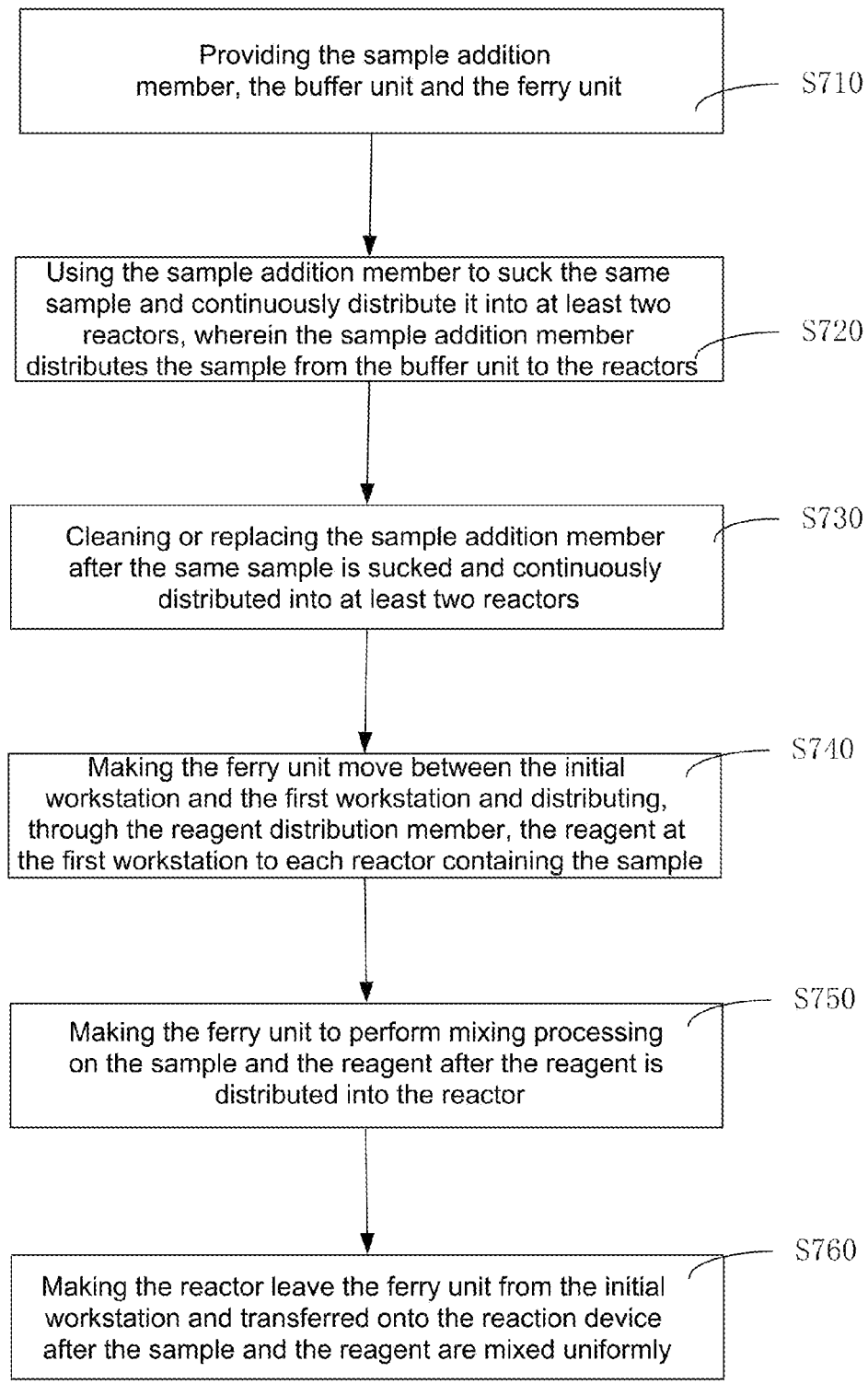
FIG. 10 is a flow chart of a second liquid distribution method.

When the above-mentioned liquid distribution device 11 is used to distribute the sample and the reagent into the reactor 20 and mix the sample and the reagent, a second liquid distribution method can also be formed. The main feature of the second liquid distribution method is that the same sample is sucked by the sample addition member 300, and distributed into at least two reactors 20 for multiple times; and at the same time, after the same sample is sucked and continuously distributed to at least two reactors, the sample addition member 300 is cleaned or replaced, and in the process of sucking the same sample and continuously distributing it to at least two reactors, the sample addition member 300 is not cleaned or replaced. Referring to FIG. 10, the second liquid distribution method mainly comprises the following steps:

S710, providing the sample addition member 300, and providing the buffer unit 100 and the ferry unit 200 at the same time;

S720, using the sample addition member 300 to suck the same sample and continuously distribute it into at least two reactors 20 of the buffer unit 100, wherein the time interval between operations of continuously distributing the sample into at least two empty reactors 20 on the buffer unit 100 is recorded as the sample distribution interval t, wherein those skilled in the art can understand that, here, the same sample specifically refers to the same sample to be tested that needs to be tested at least twice (that is, the sample corresponding to a certain subject, such as a certain patient); and the at least two tests may be at least two different analysis items, or the same analysis item may be repeated at least twice; and different samples refer to samples of different subjects;

S730: cleaning or replacing the sample addition member 300, after the same sample is sucked and continuously distributed into at least two reactors, wherein during the process of sucking the same sample and distributing it to at least two reactors continuously, the sample addition member 300 is not cleaned or replaced and in particular, between the distributions of different samples, the sample addition member 300 is cleaned or replaced;

S740, making the shortest time window, during which the sequence of actions executed by the ferry unit 200 can be cyclically reproduced, recorded as the working period T, and making the ferry unit 200 move between the initial workstation 30 and the first workstation 31, wherein the reagent is distributed at the first workstation 31 to each reactor 20 containing the sample, by using the reagent distribution member 500; and specifically, the reagent is distributed at the first workstation 31 to each reactor 20 containing the sample, on the ferry unit 200, by using the reagent distribution member 500, wherein similar to the ferry unit 200, the reagent distribution member 500 also distributes the reagent according to the working period T, that is, the reagent is distributed to only one reactor 20 containing the sample within each working period T and therefore, as for at least two reactors into which the sample addition member 300 has distributes samples according to the sample distribution interval t, the interval time between the time points at which the reagent is distributed by one same reagent distribution member 500 is at least T;

S750: making the ferry unit 200 to perform mixing processing on the sample and the reagent after the reagent is distributed into the reactor 20, wherein the ferry unit 200 can uniformly mix the reactants in the reactor 20 in a non-contact eccentric oscillating manner, thereby eliminating the carryover on the reactants caused by other contact stirring, wherein in order to increase the test throughput, during the movement from the first workstation 31 to the initial workstation 30, the ferry unit 200 can be made to mix the sample and reagent in the reactor 20; and S760, using the transferring unit 700 to make the reactor 20 leave the ferry unit 200 from the initial workstation 30 and transferred onto the reaction device 12 after the sample and the reagent are mixed uniformly.

The above-mentioned first liquid distribution method may be referred to, for other similarities of the second liquid distribution method, which will not be repeated here.

In some embodiments, the sample addition member 300 adopts a cylindrical sample needle in an elongated shape. After the same sample is sucked and continuously distributed to at least two reactors, in particular, between distributions of different samples, the sample needle is made to move to the washing tank 800. The inner and outer walls of the sample needle are cleaned at the same time to remove carryover between different samples. When cleaning, the cleaning fluid is injected into the inner cavity of the sample needle through a fluid power device, such as a syringe or a pump and so on. The cleaning fluid flowing through the inner cavity of the sample needle at a certain speed will flush the inner wall of the sample needle to achieve the cleaning effect. At the same time, the cleaning liquid is sprayed onto the outer wall of the sample needle or the outer wall is made to be immersed in the cleaning liquid, for cleaning. The cleaning liquid flowing from the inner cavity and outer wall of the sample needle can be discharged into the cleaning tank 800 at the same time. In order to ensure the thorough cleaning of the inner and outer walls of the sample needle and thereby eliminate the carryover, while ensuring the working efficiency of the sample needle and the test throughput of the immune analyzer 10, the cleaning time of the sample needle is 2 to 10 seconds.

In some embodiments, the sample addition member 300 adopts a disposable suction nozzle. After sucking the same sample and continuously distributing it to at least two reactors 20, the disposable suction nozzle is replaced. In particular, the disposable suction nozzle is replaced between the distributions of different samples. In this way, the cleaning of the disposable suction nozzle can be omitted, and the cleaning time can be reduced to improve efficiency. At the same time, the cost consumption of the disposable suction nozzle can be compensated by the reduced cost consumption of cleaning liquid.

Figure 6:
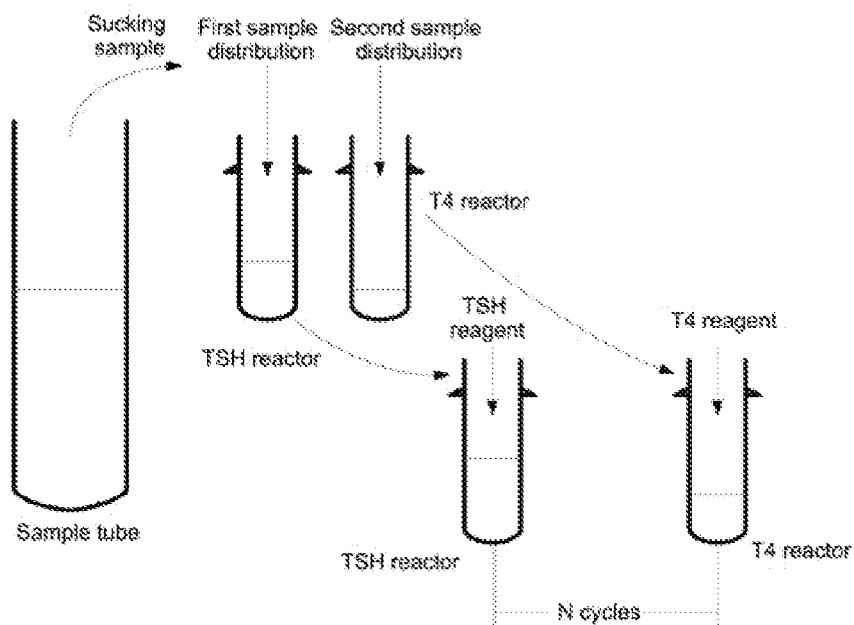
FIG. 6 is a schematic diagram showing continuously distributing the same sample into at least two reactors.
Figure 7:
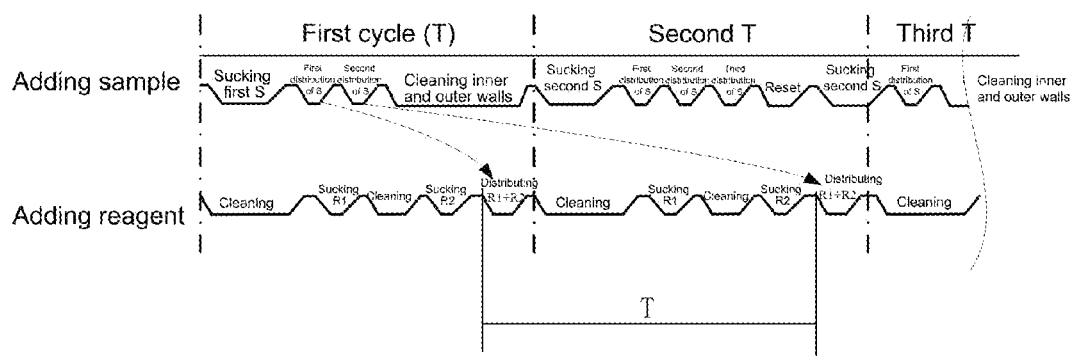
FIG. 7 is a timing diagram showing distributing the sample and reagent to the reactor.

Referring to FIGS. 6 and 7 at the same time, in some embodiments, when the sum of the samples required by all analysis items corresponding to the samples to be tested does not exceed the capacity of the sample needle, that is, when the capacity of the sample addition member 300 is greater than the sum of the same samples required by individual reactors 20, the sample addition member 300 only sucks once and distributes the same sample into different reactors 20 continuously and for multiple times. For example, the sample addition member 300 needs to suck the same blood sample (denoted as the first S) to detect two items in the "Five Thyroid Index", that is, the TSH item and the T4 item. As for the reactor 20 for detecting the TSH item, the reactor 20 (denoted as the TSH reactor) requires 100 microliters of blood sample; and as for the reactor 20 for detecting T4 item, the reactor 20 (denoted as the T4 reactor) requires 50 microliters of blood sample. At this time, the capacity of the sample addition member 300 is greater than 150 microliters, that is, the capacity of the sample addition member 300 is greater than the sum of the blood sample volume required by the TSH reactor and the T4 reactor. Therefore, the sample addition member 300 sucks at least 150 microliters of blood sample (first S) from the sample tube 430 at one time. When distributing the blood sample, the buffer unit 100 drives the TSH reactor to move to the sample addition workstation 34. The sample addition member 300 distributes 100 microliters of blood sample (first S) to the TSH reactor; then, the buffer unit 100 continues to drive the T4 reactor to move to the sample addition workstation 34. After the sample distributing interval t (there is at least one t such that t<T), the sample addition member 300 distributes 50 microliters of blood sample (first S) into the T4 reactor. Between the operations of distributing the blood sample to the TSH reactor and the T4 reactor, since the blood samples are same, there is no need to clean the sample addition member 300. Of course, the sample addition member 300 may move to the above of the cleaning tank 800 or into the cleaning tank 800, and the calibration of the hysteresis error is performed, or it can also stay at the sample addition workstation 34. Afterwards, the reagent distribution member 500 distributes the TSH reagent to the TSH reactor, wherein the TSH reagent may comprise the R1 component and the R2 component, wherein after at least one working period T, the T4 reagent is distributed to the T4 reactor, wherein the T4 reagent can comprise the R1 component and the R2 component as well.

In some embodiments, when the sum of the samples required by all the analysis items corresponding to the samples to be tested exceeds the capacity of the sample needle, that is, when the capacity of the sample addition member 300 is less than the sum of the same sample required by each reactor 20, the sample addition member 300 sucks the same sample (denoted as the second S) for several times and distributes it to different reactors 20 according to the sample distribution interval t (there is at least one t such that t<T). For example, the same sample (second S) needs to be distributed to four reactors 20 to detect four different items. Assuming the capacity of the sample addition member 300 is 500 microliters and the sum of the same sample required by the four reactors 20 exceeds 500 microliters, at this time, the sample addition member 300 can sucks for two times, to distribute the same sample (second S) to the four reactors. During the operation, the sample addition member 300 sucks for the first time the sample (second S) of less than 500 microliters, and distributes it to three reactors 20 continuously, in three times, according to the set amount. Then, the sample addition member 300 sucks for the second time the sample of less than 500 microliters and distributes it to the last reactor 20 based on the set amount. Between the first and second operations of the sample addition member 300 sucking the same sample (second S), the sample addition member 300 is moved into the cleaning tank 800, and the sample addition power unit is reset. Since the resetting process needs to be performed during the cleaning process of the sample addition member 300, and the problem of carryover between the same samples does not exist, the sample addition member 300 is cleaned only for a short time, so that the sample addition member 300 is ready for better sucking the sample for the second time.

In some embodiments, as for the sample distribution interval t, there is at least one t such that t<T, that is, within the interval of at least one working period T, the working efficiency of the sample addition member 300 is greater than the working efficiency of the reagent distribution member 500. As for the same reactor 20 into which the sample has been distributed, the reagent distribution member 500 can suck different reagent components in multiple times within each working period T and distribute them to the reactor 20. During the time interval of the working period T, in which the reagent distribution member 500 distributes each of the required reagent components to a single reactor 20, the sample addition member 300 can distribute the sample to at least two reactors 20. In short, in the time interval of the working period T, each reagent distribution member 500 can distribute individual reagent components to only one reactor 20, while the sample addition member 300 can distribute the sample to at least two reactors 20. Between operations of the reagent distribution member 500 sucking different reagent components, the reagent distribution member 500 is cleaned to prevent the carryover of different reagent components. For example, the different reagent components comprise R1 component and R2 component, and the reagent distribution member 500 sucks the R1 component and the R2 component into the same reactor 20 successively. Before the reagent distribution member 500 sucks the R2 component, the reagent distribution member 500 that has just sucked the R1 component is cleaned to prevent the R1 component from causing the carryover to the R2 component.

According to the actual needs, the sample volume which the sample addition member 300 sucks every time can be set as 10 microliters to 500 microliters. The sample volume required by each reactor 20 is 5 microliters to 250 microliters.

As for the traditional scheme, after the sample addition member 300 distributes the sample to one reactor 20 each time, the sample addition member 300 always needs to be cleaned, so as to eliminate the carryover caused by the sample addition member 300 entering the sample tube 430 to suck the sample again and distributing the sample, which will increase the number of cleaning times. Thus, this leads to at least the three defects as follows. First, the time consumption is great, which also reduces the working efficiency of the sample addition member 300, thereby affecting the test throughput of the entire immune analyzer 10. Second, the amount of the consumed cleaning liquid is great, which increases the test cost of the immune analyzer 10. Third, due to the number of cleaning times is large, in order to ensure the working efficiency of the sample addition member 300 and ensure the test throughput, the cleaning time of the sample addition member 300 will be reduced, so that the sample addition member 300 is not thoroughly cleaned and the carryover cannot be effectively eliminated.

The second liquid distribution method has at least the following beneficial effects. First, since the sample addition member 300 sucks the same sample and continuously distributes it into at least two reactors 20, the sample addition member 300 does not need to enter again the sample tube 430 to suck the sample between operations of continuously distributing the same sample to the two reactors 20, and there is no need to clean the sample addition member 300, so the sample addition member 300 may be cleaned every at least two reactors 20, which effectively avoids the phenomenon in the traditional scheme that the sample addition member 300 needs to be cleaned only every other reactor 20. In this way, the number of times of cleaning the sample addition member 300 can be reduced, thereby improving the working efficiency of the sample addition member 300 and the test throughput of the immune analyzer 10. Secondly, between the operations of the sample addition member 300 entering the sample tube 430 many times to suck the same sample, the sample addition member 300 needs to be cleaned for only a short period of time, so that the sample addition member 300 can distribute a certain type of the same sample together, and then distribute another type of the same sample together, so as to reduce the frequency of switching between different samples, and further reduce the number of cleaning times and the cleaning period of the sample addition member 300. Third, since the number of cleaning times of the sample addition member 300 is reduced, on the basis of ensuring work efficiency and test throughput, the cleaning time of each time of sample addition member 300 can be appropriately prolonged, so that the sample addition member 300 can be thoroughly cleaned and the risk of carryover between different samples is effectively reduced. Obviously, the reduction in the number of cleaning times will also reduce the consumption of the cleaning liquid, which can reduce the test cost of the immune analyzer 10. Fourth, on the basis of improving the sample addition efficiency and effectively reducing the carryover between samples, the ferry unit 200 and the reagent distribution member 500 efficiently move in cooperation, which further improves the efficiencies of reagent distribution and reactant mixing. In the working period T, the reagent is distributed, at the first workstation 31 by the reagent distribution member 500, into each reactor 20 containing the sample, and the sample and the reagent are mixed by the ferry unit 200. The sample distribution is completed through the buffer unit, and the reagent distribution and the reactant mixing are both completed on the ferry unit, which improves the efficiencies of the distributions of the sample and reagent and the reactant mixing, thereby improving the test efficiency and throughput of the immune analyzer. For example, the test throughput of the immune analyzer of the present application can exceed the highest level (600 tests per hour) currently reported in the industry, and the test throughput of 720 or 800 tests per hour or even higher is achieved.

Figure 8:
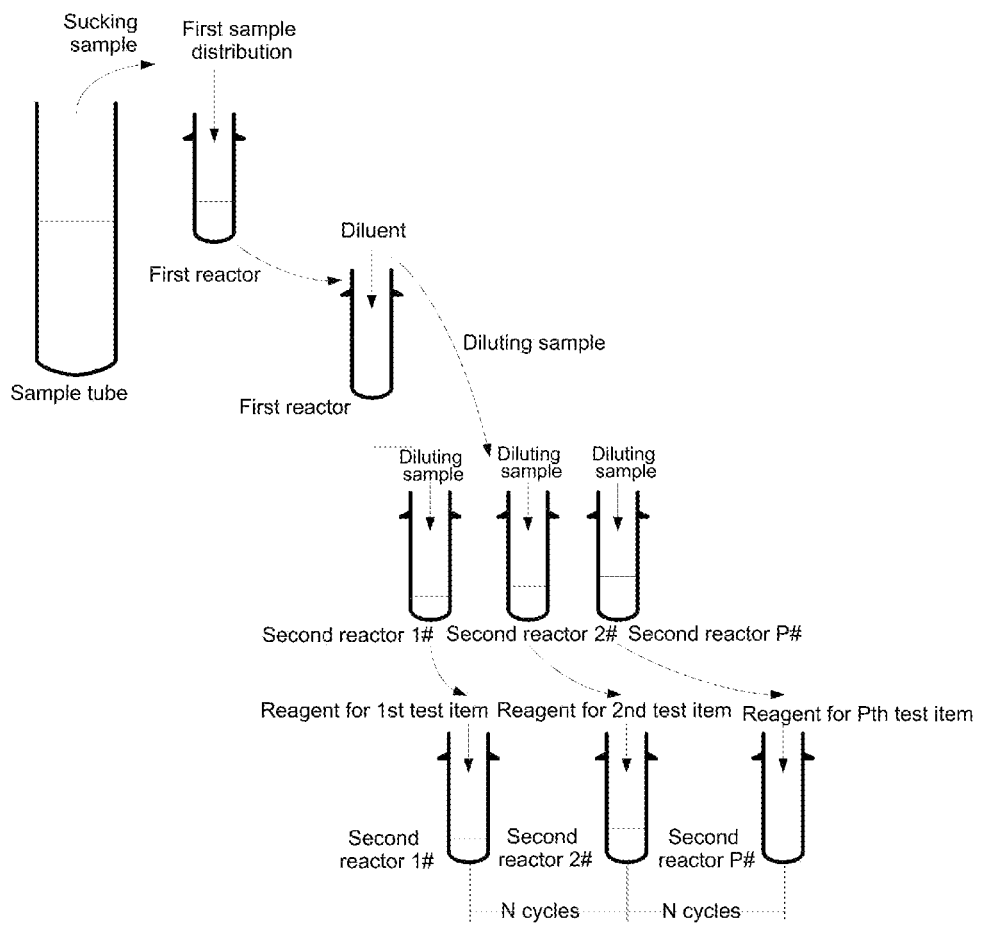
FIG. 8 is a schematic diagram showing providing the diluted sample to at least two reactors.
Figure 11:
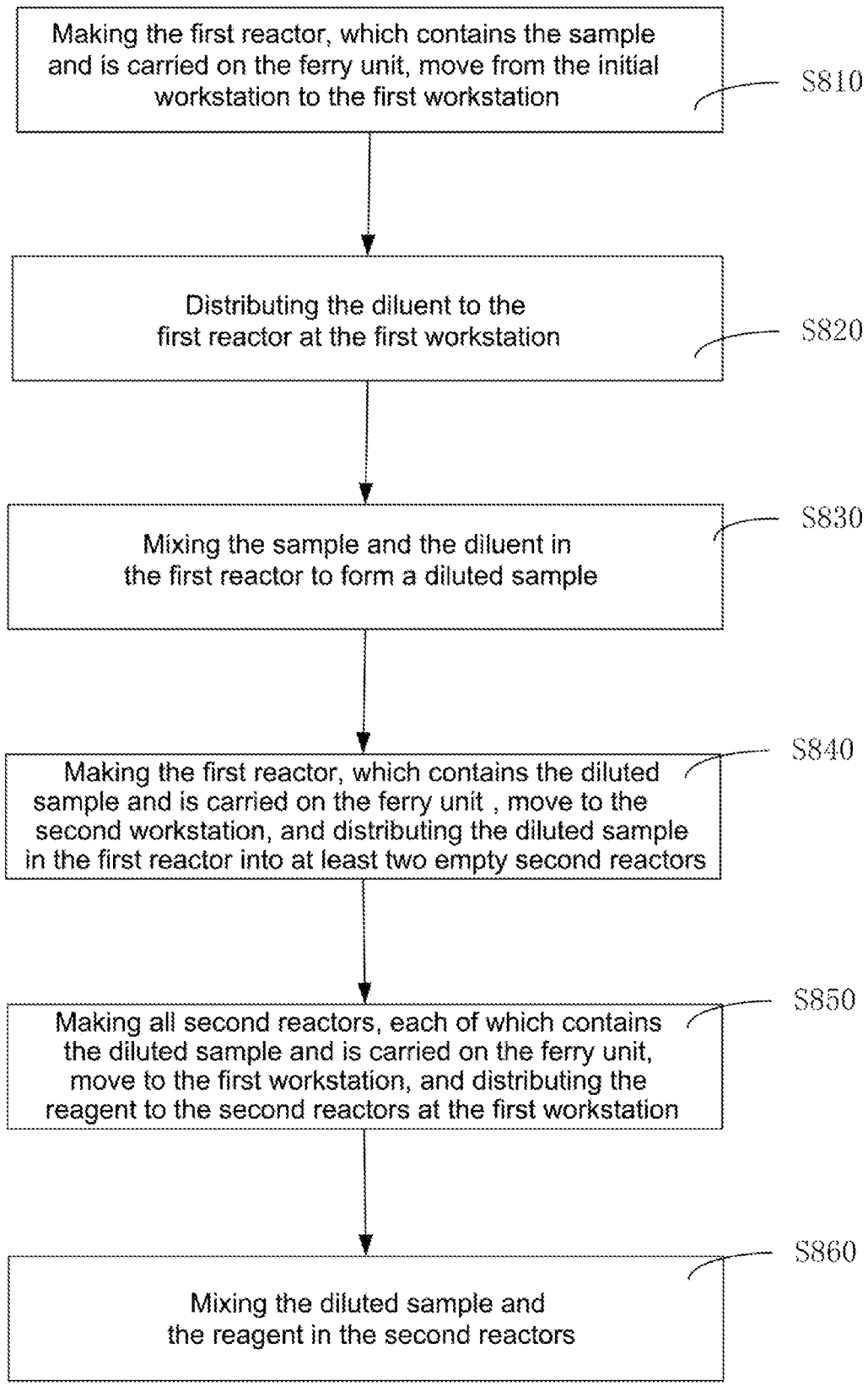
FIG. 11 is a flow chart of a sample dilution method.

The above-mentioned liquid distribution device 11 is used to distribute into the reactor 20 the sample and diluent (as mentioned above, the diluent can be regarded as a component of the reagent corresponding to the analysis item), and the sample and diluent are mixed to form a diluted sample. Then the diluted sample is distributed into a plurality of reactors 20, and finally the reagent is distributed to the reactors 20 containing the diluted sample and the mixing process is performed. At this time, a sample dilution method can be formed. Referring to FIG. 8 and FIG. 11 at the same time, the sample dilution method mainly comprises the following steps:

S810: making the first reactor, which contains the sample and is carried on the ferry unit 200, move from the initial workstation 30 to the first workstation 31;

S820: distributing the diluent to the first reactor at the first workstation 31, S830: mixing the sample and the diluent in the first reactor to form a diluted sample;

S840. making the first reactor, which contains the diluted sample and is carried on the ferry unit 200, move to the second workstation 32, and distributing the diluted sample in the first reactor at the second workstation into at least two empty second reactors, wherein of course, depending on the different analysis test items, the amount of diluted sample distributed to each empty second reactor may be different, wherein for example, the amount of the diluted sample distributed in one of the second reactors may be greater than the amount of the diluted sample distributed in the other second reactor;

S850, making the second reactors each of which contains the diluted sample and is carried on the ferry unit 200, move to the first workstation 31, and distributing the reagent to the second reactors at the first workstation 31; and S860, mixing the diluted sample and the reagent in the second reactors.

In some embodiments, referring to the related description in the above-mentioned first liquid distribution method, the first reactor is placed on the buffer unit 100, and after distributing the sample into the first reactor on the buffer unit 100 through the sample addition member 300, the first reactor containing the sample is transferred from the buffer unit 100 to the ferry unit 200, at the initial workstation 30. In other words, the samples are distributed from only the buffer unit 100 (not from the ferry unit 200) to the reactor 20, so that the distribution of sample will not be restricted by the movement speed and location of the ferry unit 200. When the reactors 20 carried by the ferry unit 200 is moving or being stationary, the sample can be distributed from the buffer unit 100 (not from the ferry unit 200) to the reactor 20, thereby increasing the test throughput of the immune analyzer 10.

In some embodiments, an empty second reactor is placed on the buffer unit 100. After the diluted sample is distributed to the second reactor, the second reactor containing the diluted sample, at the initial workstation 30, is transferred from the buffer unit 100 to the ferry unit 200. The sample and diluent in the first reactor and the diluted sample and reagent in the second reactor are all subjected to mixing processing by the ferry unit 200 itself. The method of mixing processing is non-contact eccentric oscillation processing. At the same time, the initial workstation 30 is set between the first workstation 31 and the second workstation 32, and the ferry unit 200 is made to perform the reciprocating linear movement between the initial workstation 30, the first workstation 31 and the second workstation 32.

In some embodiments, the buffer unit 100 is made to move between the receiving workstations 33, the sample addition workstations 34 and the removing workstations 35. Both the first reactor and the second reactor enter the buffer unit 100 from the receiving workstations 33. The sample is distributed from the sample addition workstation 34 to the first reactor. The diluted sample is also distributed from the sample addition workstation 34 to the second reactor. Both the first reactor and the second reactor leave the buffer unit 100 at the removing workstations 35 and are transferred to the ferry unit 200. When the buffer unit 100 is the turntable 110, the turntable 110 drives the first reactor and second reactor to make a circular movement between the receiving workstations 33, the sample addition workstations 34, and the removing workstations 35. When the buffer unit 100 is a slider 120, the slider 120 drives the first reactor and second reactor to move linearly between the receiving workstations 33, the sample addition workstations 34, and the removing workstations 35.

As for the traditional sample dilution method, the diluted sample formed by each mixing of the liquid distribution device 11 can only be used by one reactor 20, that is, the liquid distribution device 11 should perform a single mixing process on each reactor 20 to form the diluted sample. In other words, the diluted sample formed by one mixing process corresponds to only one reactor 20. This increases the number of times of the mixing processing for forming a diluted sample, thereby reducing the working efficiency of sample dilution, and further affecting the maximum test throughput of the immune analyzer 10.

As for the aforementioned sample dilution method, the liquid distribution device 11 mixes the sample and the diluent in the first reactor to form a diluted sample, and distributes the diluted sample in the first reactor to at least two second reactors. Therefore, the diluted sample formed by each mixing of the liquid distribution device 11 can be used by at least two reactors 20, so that there is no need to use the liquid distribution device 11 to perform one mixing process separately for each reactor 20 to form the diluted sample. In other words, the diluted sample formed by one mixing process can correspond to at least two reactors 20, which can greatly reduce the number of the times of the mixing processing for forming a diluted sample, and improve the working efficiency of the sample dilution method, therefore improving the maximum test throughput of the immune analyzer 10. In particular, as for immunoassay items that the sample to be tested needs to be automatically diluted before being tested, such as the test items, the autoimmune disease or the allergen testing, etc., the sample dilution is often required, and multiple tests are required for the diluted sample. For this type of test items, this sample dilution method effectively solves the bottleneck of the maximum test throughput of the immune analyzer 10.

Figure 5:
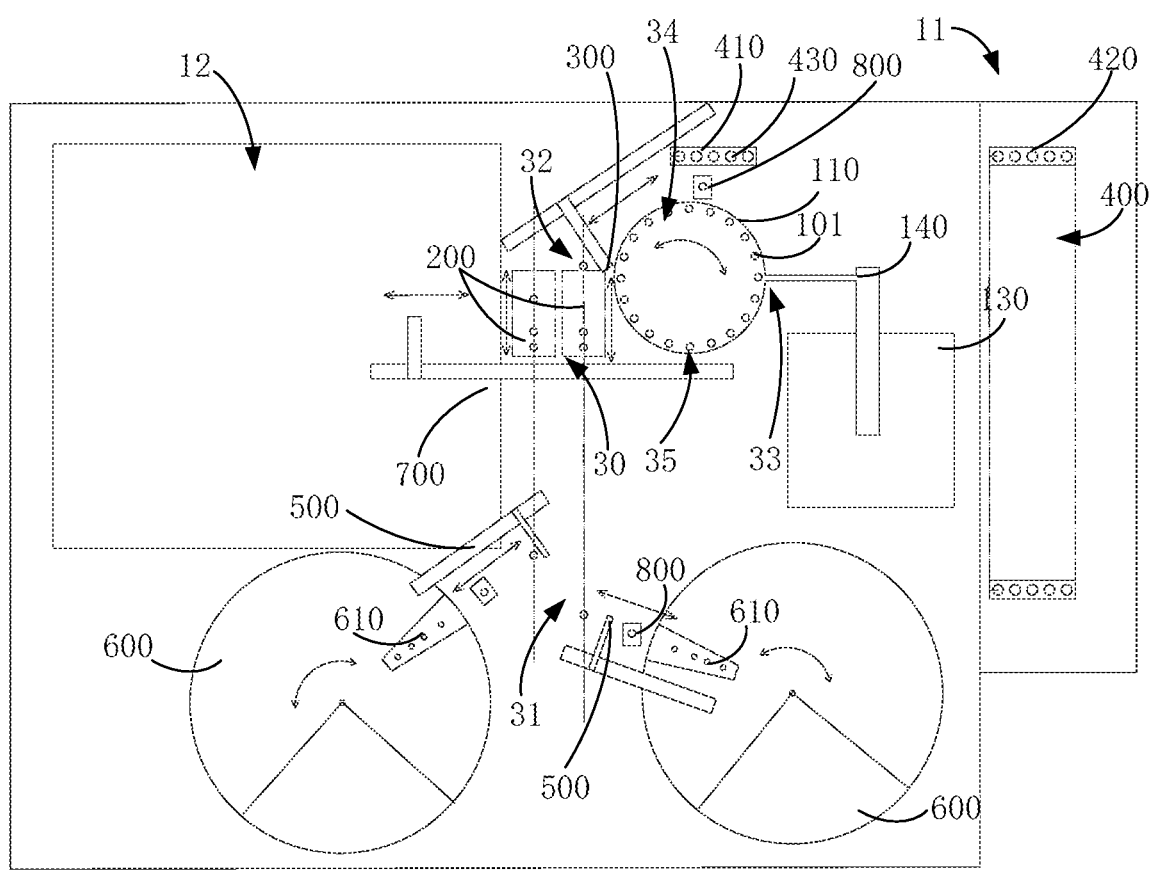
FIG. 5 is a planar schematic diagram of the structure of the immune analyzer provided by the second embodiment.
Figure 12:
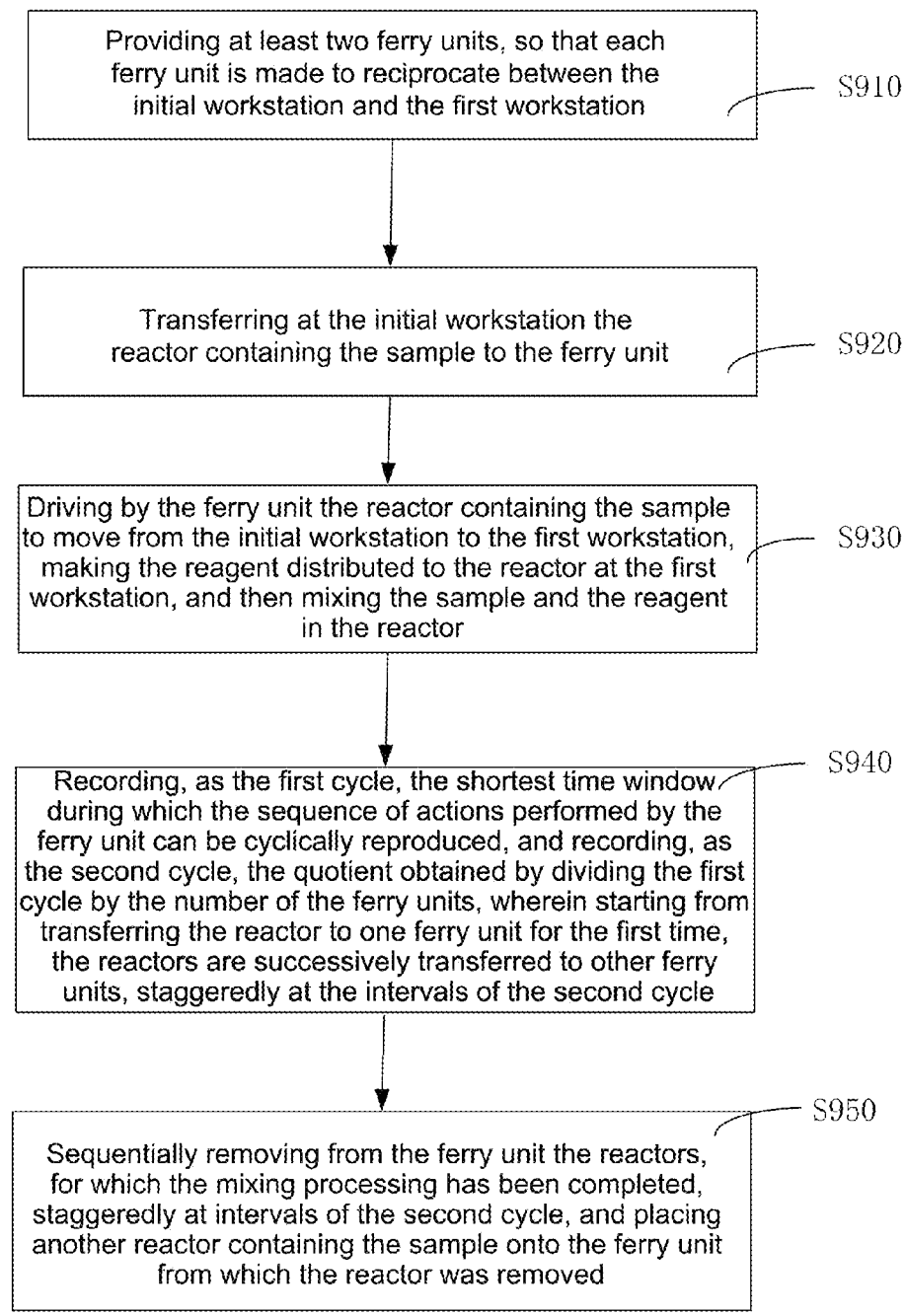
FIG. 12 is a flow chart of a third liquid distribution method.

Referring to FIGS. 5 and 12 at the same time, when the number of the ferry units 200 of the liquid distribution device 11 mentioned above is at least two, a third liquid distribution method can be formed. Of course, the third liquid distribution method is similar to the first liquid distribution method, that is, the sample is not distributed from the ferry unit to the reactor 20, but from the buffer unit 100 into the reactor 20, and after the sample is distributed into the reactor 20, the transferring unit transfers the reactor 20 containing the sample from the buffer unit 100 to the ferry unit 200. The third liquid distribution method mainly comprises the following steps:

S910: providing at least two ferry units 200, so that each ferry unit 200 is made to reciprocate between the initial workstation 30 and the first workstation 31;

S920. transferring at the initial workstation 30 the reactor 20 containing the sample to the ferry unit 200, wherein in fact, the sample is distributed from the buffer unit 100 to the reactor 20, and after the sample is distributed to the reactor 20 on the buffer unit 100, the reactor 20 containing the sample is removed from the buffer unit 100 and transferred to the ferry unit 200, at the initial workstation 30;

S930: driving, by the ferry unit 200, the reactor 20, which is input from the buffer unit 100 and contains the sample, to move from the initial workstation 30 to the first workstation 31, and making the reagent distributed to the reactor 20 at the first workstation 31, and then mixing the sample and the reagent in the reactor 20;

S940. recording, as the first cycle, the shortest time window during which the sequence of actions performed by the ferry unit 200 can be cyclically reproduced, and recording, as the second cycle, the quotient obtained by dividing the first cycle by the number of the ferry units 200, wherein starting from transferring the reactor 20 to one ferry unit 200 for the first time, the reactors 20 successively are transferred to other ferry units 200, staggeredly at the intervals of the second cycle;

S950, sequentially removing from the ferry unit 200 the reactors 20 for which the mixing processing has been completed, staggeredly at intervals of the second cycle, and placing another reactor 20 containing the sample onto the ferry unit 200 from which the reactor 20 was removed.

In order to enable the entire immune analyzer 10 to have higher test throughput, the length of the second cycle can be any suitable value within 4-15 seconds, such as 4 seconds, 4.5 seconds, 5 seconds, 6 seconds, 9 seconds, etc., corresponding to the test throughput of 900-240 tests per hour, that is, the immune analyzer 10 can continuously report 900-240 results per hour. To facilitate the understanding, the second cycle of 5 seconds will be taken as an example for illustration.

If the immune analyzer 10 must complete the measurement of one reactor 20 every 5 seconds, that is, reporting one test result every 5 seconds, at this time, the time of the second cycle is 5 seconds. Regarding the entire immune analyzer 10 as an assembly line, it is necessary to ensure that the flow rates at all points of the assembly line are equal to each other, so that the ferry unit 200 must output one reactor 20 for which the mixing processing has been completed, every 5 seconds, similarly. If there is only one ferry unit 200, since the sum of time is greater than 5 seconds, with the time being required by the ferry unit 200 performing, during one cycle, a sequence of actions, such as transferring the reactor 20 containing the sample into the ferry unit, receiving the reagent distributed by the reagent distribution member 500, eccentric oscillating for mixing, and removing the reactor 20 for which the mixing processing has been completed, the ferry unit 200 cannot output, every 5 seconds, one reactor 20 for which the mixing processing has been completed, and the flow rate of the ferry unit 200 is lower than the outlet flow rate of the assembly line, resulting in that the assembly line cannot work continuously with the maximum efficiency (test throughput). Therefore, by setting the first cycle as twice the second cycle, that is, the first cycle is 10 seconds and at the same time, setting the number of ferry units 200 as two, a sequence of the actions performed by the two ferry units 200 are executed at intervals of the second cycle (i.e., 5 seconds), that is, the two ferry units 200 "run in parallel, staggeredly" at intervals of the second cycle.

During working, according to the existing movement law of the ferry unit 200, if at the 0th second, the reactor 20 containing the sample is transferred to the first ferry unit 200, then at the 5th second, the reactor 20 containing the sample is transferred to the second ferry unit 200. Assuming that the reactor 20 on the first ferry unit 200 will be output at the 10th second, after the output of the reactor 20, the reactor 20 containing the sample will be transferred to the first ferry unit. Then, the reactor 20 on the second ferry unit 200 will be output at the 15th second. Similarly, after the output of the reactor 20, the reactor 20 containing the sample is transferred to the second swing unit. The operation will be circulated according to the above-mentioned operation mode, the first ferry unit 200 is caused to output one reactor 20 at the 10th second, the 20th second, the 30th second, . . . the 10Nth second, and at the same time, the second ferry unit 200 will output one reactor 20 at the 15th second, the 25th second, the 35th second, . . . the (5N+10)th second. Therefore, on the basis that each ferry unit 200 outputs every 10 seconds one reactor 20 for which the mixing processing has been completed, the two ferry units 200, as a whole, will output every 5 seconds one reactor 20 for which the mixing processing has been completed, so as to achieve the purpose of "obtaining time using quantity", and finally meet the requirements of the highest test throughput of the immune analyzer 10.

Of course, when the second cycle is still 5 seconds, the time of the first cycle can be longer. At this time, the number of the ferry unit 200 is set as three, four or even more. The first cycle can be set as being three times, four times or even more folds than the second cycle, that is, the first cycle is 15 seconds or 20 seconds, etc. In this way, on the basis of ensuring the test throughput, the movement speed of the ferry unit 200 can be reduced, and the reagent distribution and the mixing time of the sample and the reagent can be prolonged. The bottlenecks of the movement speed of the ferry unit 200, the reagent distribution, and the mixing time of the sample and reagent can be effectively solved. Under the condition that the movement speed of the ferry unit 200 and the mixing time of the sample and reagent are constant, each ferry unit 200 still outputs every 10 seconds one reactor 20 for which the mixing processing has been completed, that is, the first cycle is still 10 seconds.

In the case that the number of storage units 600 is equal to the number of the ferry units 200 in the liquid distribution device 11, the third liquid distribution method further comprises the following steps:

providing the storage units 600 in the number equal to that of the ferry units 200, wherein the reagents are stored in the multiple storage parts 610 of each storage unit 600;

making the storage parts 610 move following the storage unit 600 to the liquid suction workstation for sucking the reagent; and making the shortest time window, in which the sequence of actions executed by each storage unit 600 can be reproduced cyclically, equal to the first cycle, and from the first time when one of the storage units 600 drives the storage parts 610 to move toward the liquid suction workstation, sequentially making other storage units 600, staggeredly at intervals of the second cycle, to drive the storage parts 610 to move toward the corresponding liquid suction workstation.

With reference to the above-mentioned related description of at least two ferry units 200 "running in parallel, staggeredly" at intervals of the second cycle, the number of storage units 600 is equal to the number of ferry units 200, and the storage units 600 are also made to "run in parallel, staggeredly" at intervals of the second cycle. Regarding all storage units 600 as a whole, the storage parts 610 on one of the storage units 600 always move to the liquid suction workstation at intervals of the second cycle, so that the reagent distribution member 500 can suck the reagent at the liquid suction workstation. Therefore, for a single storage unit 600, although the storage parts 610 are driven to the liquid suction workstation at intervals of the first cycle, the storage parts 610 are driven to the liquid suction workstation at intervals of the second cycle when all the storage units 600 are regarded as a whole, which can also achieve the purpose of "obtaining time using quantity", and finally meet the requirements of the highest test throughput of the immune analyzer 10.

In addition, for traditional scheme, the number of storage unit 600 is usually one. In order to increase the amount of stored reagents for analysis items, the number of storage units 610 must be increased, which leads to an increase in the size of the entire storage unit 600. The occupied area of the storage unit 600 is large, which is not conducive to the layout and manufacturing of the storage unit 600. At the same time, a bottleneck in achieving high test throughput is that for the storage unit 600 with a relatively large volume and weight, the difficulty in its movement control is also increased, which results in the storage parts 610 being unable to reach the designated position within a short period of time for allowing the reagent distribution member 500 to suck the reagents. At the same time, when the storage unit 600 fails, the entire immune analyzer 10 will not work. In the third liquid distribution method, at least two storage units 600 are provided, with each storage unit 600 having a small volume, which is beneficial to the layout and movement control of the whole machine and can also ensure a large reagent storage capacity. At the same time, the tolerance of the storage unit 600 to failure can be improved. When one of the storage units 600 fails and cannot work, the other remaining storage units 600 can continue to work to ensure the continuous supply of reagents. Of course, the faulty storage unit 600 can be repaired while other storage units 600 are working.

In some embodiments, the reagent distribution members 500 in a number equal to the number of storage units 600 are provided, such that each storage unit 600 corresponds to one reagent distribution member 500. In this way, the efficiency of reagent distribution can be improved, and of course, the working efficiency (load) of a single reagent distribution member 500 can be reduced on the basis of ensuring the maximum test throughput. The shortest time window, in which the sequence of actions performed by each reagent distribution member 500 can be reproduced cyclically, is equal to the first cycle. From the time when one of the reagent distribution members 500 distributes the reagents, other reagent distribution members 500 are sequentially made to distribute the reagents, staggeredly at intervals of the second cycle.

With reference to the above-mentioned related description of at least two ferry units 200 and at least two storage units 600 "staggeredly running in parallel" at intervals of the second cycle, the number of reagent distribution members 500 is equal to the number of storage units 600 and the number of ferry units 200, and at the same time, the reagent distribution member 500 is also made to "staggeredly run in parallel" at intervals of the second cycle. Regarding all the reagent distribution members 500 as a whole, one of the reagent distribution members 500 always distributes the reagent at intervals of the second cycle. Therefore, for a single reagent distribution member 500, although the reagent is distributed into one reactor 20 at the interval of the first cycle, the reagent distribution member 500 distributes the reagent once at the interval of the second cycle when all the reagent distribution members 500 are regarded as a whole, which can also achieve the purpose of "obtaining time using quantity", and finally meet the requirements of the highest test throughput of the immune analyzer 10.

When the ferry units move linearly between the initial workstation 30 and the first workstation 31, the storage units 600 can be divided into two halves of equal number, wherein one half of the storage units 600 and the other half of the storage units 600 are symmetrical with respect to the movement tracks of the ferry units, which is conducive to the layout of the whole immune analyzer 10.

Therefore, by transferring the reactor 20 containing the sample to the ferry unit 200 at the initial workstation 30, that is, distributing the sample from the buffer unit 100 to the reactor 20 in advance, the time for the berry unit 200 distributing the sample to the reactor 20 is saved, thereby reducing the residence time that the reactor 20 stays on each ferry unit 200 and enabling each ferry unit 200 to output one reactor 20 quickly. At the same time, the number of ferry units 200 is set as at least two. The at least two ferry units 200 "staggeredly run in parallel" at intervals of the second cycle. Although a single ferry unit 200 outputs one reactor 20 at interval of the first cycle, all ferry units 200, as a whole, may output one reactor 20 at interval of the second cycle which is shorter, so as to achieve the purpose of "obtaining time using quantity", and finally meet the requirements of the highest test throughput of the immune analyzer 10.

In some embodiments, the third liquid distribution method is similar to the second liquid distribution method, that is, the same sample is sucked by the sample addition member 300 and continuously distributed to at least two reactors 200 on the buffer unit 100, and at the same time, after the same sample is sucked and continuously distributed to the at least two reactors, the sample addition member 300 is cleaned or replaced. The beneficial effects thereof can be learned with reference to the description of the above-mentioned second liquid distribution method.

Similarly, in the process of distributing the sample, the sample addition member 300 is a sample needle or a disposable suction nozzle. After the same sample is sucked and continuously distributed to at least two reactors, the inner and outer walls of the sample needle are cleaned or the disposable suction nozzle is replaced. For thorough cleaning, the time for cleaning the sample needle is 2 to 10 seconds. When the capacity of the sample addition member 300 is greater than the total amount of the same sample required by individual reactors 20, the sample addition member 300 only sucks once and distributes the same sample to different reactors 20 continuously and for multiple times.

Figure 13:
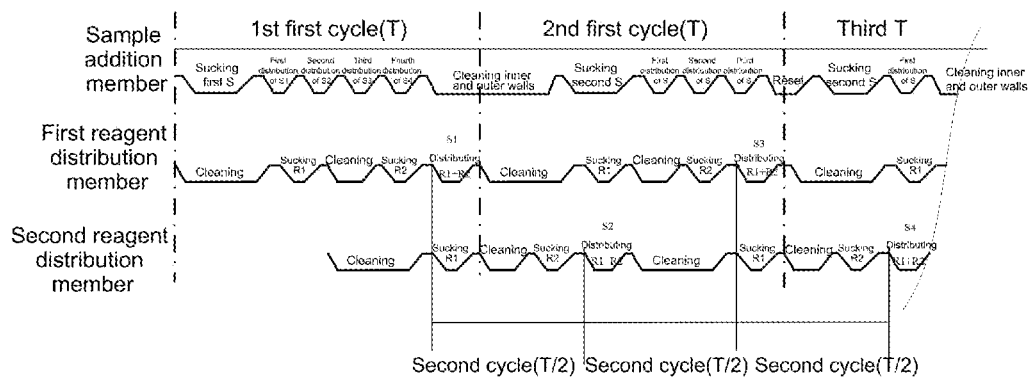
FIG. 13 is a timing diagram of the third liquid distribution method for distributing the sample and the reagent to the reactor.

Referring to FIG. 13, the same sample (first S) being used to test four analysis items is taken as an example for illustration. The sample addition member 300 sucks the same sample (the first S) once, and continuously distributes, for four times, the first S divided into four parts (denoted as S1, S2, S3, and S4, respectively) to four reactors. Since the next sample to be sucked by the sample addition member 300 is a different sample, after distributing the S1, S2, S3 and S4 to the four reactors, the inner and outer walls of the sample needle of the sample addition member 300 are cleaned or the disposable suction nozzle is replaced.

For the four reactors distributed with the sample by the sample addition member 300 after one suction, each reagent distribution member 500 distributes, in the first cycle, the reagent corresponding to the analysis item to the reactor, in which the first S has been distributed, on the ferry unit 200 at the first workstation, and the reagent corresponding to the analysis item is distributed by another reagent distribution member, to the reactor at a ferry position, in which the first S has been distributed, on the ferry unit 200 at the first workstation 31, with the distribution by the two reagent distribution members 500 performed at an interval of N second cycles. Specifically, the first reagent distribution member 500 distributes, in the 1st first cycle T, the reagent into the first reactor 20 containing S1, and distributes, in the 2nd first cycle T, the reagent into the third reactor 20 containing S3; while the second reagent distribution member 500 distributes, in the 2nd first cycle T, the reagent into the second reactor 20 containing S2, and distributes, in the 3rd first cycle T, the reagent into the fourth reactor 20 containing S4. It can be seen that the distribution of the reagents corresponding to the analysis items by the first reagent distribution member 500 and the second reagent distribution member 500 are performed at an interval of N second cycles (T/2). In this way, it can be ensured that in each second cycle (T/2), there is a reactor 20 of which the distribution of the reagent is completed, thereby improving the distribution efficiency of the reagents. In short, for at least two reactors to which the same sample has been distributed, individual reagent distribution members 500 distributes the reagent for the analysis item sequentially staggeredly at the intervals of the second cycle (T/2), and each at the interval of N first cycles (N is an integer and N≥1).

The third liquid distribution method of the present application enables, on the basis of improving the sample distribution efficiency and effectively reducing the carryover between samples, at least two ferry units 200, at least two storage units 600, and at least two reagent distribution members 500 to effectively move in cooperation, which further improves the efficiencies of reagent distribution and reactant mixing, and thereby improving the test efficiency and throughput of the immune analyzer. For example, the test throughput of the immune analyzer of the present application can exceed the highest level (600 tests per hour) currently reported in the industry, and test throughput of 720, 800 tests per hour or even higher is achieved.

The present application also provides an immunoassay method, which comprises the steps in the first liquid distribution method, the second liquid distribution method, the third liquid distribution method, and the sample dilution method described above.

The technical features of the above-mentioned embodiments can be combined arbitrarily. In order to make the description concise, all possible combinations of the various technical features in the above-mentioned embodiments are not described. However, as long as there is no contradiction in the combination of these technical features, all combinations should be considered as the scope of this specification.

The above-mentioned embodiments only express several implementations of the present application, and their descriptions are more specific and detailed, but they should not be understood as a limitation on the patent scope of the present application. It should be pointed out that for those ordinary skilled in the art, without departing from the concept of the present application, several modifications and improvements can be made, and these all fall within the protection scope of the present application. Therefore, the scope of protection of the present application shall be subject to the appended claims.

What is claimed is:

1. A liquid distribution method, comprising following steps:
   providing at least two ferry units, so that each ferry unit is made to reciprocate between an initial workstation and a first workstation;
   transferring, at the initial workstation, a reactor containing a sample onto each of the ferry units;
   driving, via a motor, each of the ferry units from the initial workstation to a first workstation;
   adding, at the first workstation, a reagent into the reactors of each of the ferry units;
   driving, via the motor, each of the ferry units from the first workstation to the initial workstation;
   concurrently driving, via a driver, each of the ferry units to eccentrically oscillate during the driving from the first workstation to the initial workstation, to mix the sample and reagent within each of the ferry units without an additional independent mixing device;
   recording, as a first cycle, a shortest time window during which a sequence of actions performed by each of the ferry units can be cyclically reproduced, and recording, as a second cycle, a quotient obtained by dividing the first cycle by the number of ferry units as a second cycle, wherein starting from transferring the reactor to one ferry unit for the first time, the reactors are successively transferred to other ferry units, staggered at intervals of the second cycle; and
   sequentially removing, from the ferry units, the reactors of each of the ferry units for which the mixing of the sample and reagent within each of the ferry units has been completed, staggered at the intervals of the second cycle, and placing another reactor containing the sample onto the ferry unit from which the reactor was removed.

2. The liquid distribution method according to claim 1, further comprising following steps:
   providing storage units in number equal to the number of ferry units, and making reagents stored in multiple storage parts of each storage unit;
   making the storage parts follow the storage unit to move to a liquid suction workstation for sucking the reagents; and
   making the shortest time window, in which a sequence of actions executed by each storage unit can be reproduced cyclically, equal to the first cycle, wherein starting from the first time when one of the storage units drives the storage parts to move toward a liquid suction workstation, other storage units are sequentially made to drive the storage parts to move toward corresponding liquid suction workstations, staggered at the intervals of the second cycle.

3. The liquid distribution method according to claim 2, wherein reagent distribution members in number equal to that of the storage units are provided and configured for distributing the reagents, wherein each storage unit corresponds to one reagent distribution member.

4. The liquid distribution method according to claim 1, wherein the ferry units move linearly between the initial workstation and the first workstation.

5. The liquid distribution method according to claim 4, wherein the storage units are divided into two halves of equal number, wherein one half of the storage units and the other half of the storage units are symmetrical with respect to movement tracks of the ferry units.

6. The liquid distribution method according to claim 1, wherein a buffer unit configured for carrying and driving the reactors to move is provided, wherein when the sample is added to one reactor on the buffer unit, the reactor containing the sample is transferred from the buffer unit at the initial workstation to the ferry unit.

7. The liquid distribution method according to claim 6, further comprising following sub-steps:
using a sample addition member to suck a same sample and continuously discharge the same sample into at least two reactors on the buffer unit; and
cleaning or replacing the sample addition member after the same sample is sucked and continuously distributed to the at least two reactors.

8. The liquid distribution method according to claim 7, wherein the sample addition member is a sample needle or a disposable suction nozzle, wherein after the same sample is sucked and continuously distributed to the at least two reactors, an inner wall and an outer wall of the sample needle are cleaned, or the disposable suction nozzle is replaced.

9. The liquid distribution method according to claim 8, wherein time for cleaning the sample needle is 2 seconds to 10 seconds.

10. The liquid distribution method according to claim 7, wherein the sample addition member is cleaned or replaced when switching between suctions of different samples.

11. The liquid distribution method according to claim 7, wherein when a capacity of the sample addition member is greater than a total amount of the same sample required by individual reactors, the sample addition member sucks only once and discharges the same sample into different reactor continuously and for multiple times.

12. An immunoassay method, comprising the steps in the liquid distribution method according to claim 1.

13. The immunoassay method according to claim 12, wherein the liquid distribution method further comprises following steps:
providing storage units in number equal to the number of ferry units, and making reagents stored in multiple storage parts of each storage unit;
making the storage parts follow the storage unit to move to a liquid suction workstation for sucking the reagents; and
making the shortest time window, in which a sequence of actions executed by each storage unit can be reproduced cyclically, equal to the first cycle, wherein starting from the first time when one of the storage units drives the storage parts to move toward a liquid suction workstation, other storage units are sequentially made to drive the storage parts to move toward corresponding liquid suction workstations, staggered at the intervals of the second cycle.

14. The immunoassay method according to claim 13, wherein reagent distribution members in number equal to that of the storage units are provided and configured for distributing the reagents, wherein each storage unit corresponds to one reagent distribution member.

15. The immunoassay method according to claim 12, wherein the ferry units move linearly between the initial workstation and the first workstation.

16. The immunoassay method according to claim 15, wherein the storage units are divided into two halves of equal number, wherein one half of the storage units and the other half of the storage units are symmetrical with respect to movement tracks of the ferry units.

17. The immunoassay method according to claim 12, wherein a buffer unit configured for carrying and driving the reactors to move is provided, wherein when the sample is added to one reactor on the buffer unit, the reactor containing the sample is transferred from the buffer unit at the initial workstation to the ferry unit.

18. The immunoassay method according to claim 17, wherein the liquid distribution method further comprises following sub-steps:
using a sample addition member to suck a same sample and continuously discharge the same sample into at least two reactors on the buffer unit; and
cleaning or replacing the sample addition member after the same sample is sucked and continuously distributed to the at least two reactors.

19. The immunoassay method according to claim 18, wherein the sample addition member is a sample needle or a disposable suction nozzle, wherein after the same sample is sucked and continuously distributed to the at least two reactors, an inner wall and an outer wall of the sample needle are cleaned, or the disposable suction nozzle is replaced.

20. The immunoassay method according to claim 19, wherein time for cleaning the sample needle is 2 seconds to 10 seconds.

* * * * *